(12) United States Patent
Yokoyama et al.

(10) Patent No.: US 8,359,601 B2
(45) Date of Patent: Jan. 22, 2013

(54) DATA PROCESSING METHOD, CLUSTER SYSTEM, AND DATA PROCESSING PROGRAM

(75) Inventors: Takahiro Yokoyama, Yokohama (JP); Tsunehiko Baba, Hachioji (JP); Masanori Kawashima, Yokohama (JP); Kazuho Tanaka, Fujisawa (JP)

(73) Assignee: Hitachi Ltd., Tokyo (JP)

( * ) Notice: Subject to any disclaimer, the term of this patent is extended or adjusted under 35 U.S.C. 154(b) by 1022 days.

(21) Appl. No.: 12/366,731

(22) Filed: Feb. 6, 2009

(65) Prior Publication Data

US 2010/0043010 A1    Feb. 18, 2010

(30) Foreign Application Priority Data

Aug. 12, 2008 (JP) .................. 2008-207708

(51) Int. Cl.
*G06F 17/30* (2006.01)
(52) U.S. Cl. ..................... 718/105; 718/101
(58) Field of Classification Search .............. None
See application file for complete search history.

(56) References Cited

U.S. PATENT DOCUMENTS

| | | | | |
|---|---|---|---|---|
| 5,764,903 | A * | 6/1998 | Yu .................. | 709/208 |
| 5,944,779 | A * | 8/1999 | Blum ............... | 709/201 |
| 6,442,706 | B1 * | 8/2002 | Wahl et al. ........ | 714/6.12 |
| 6,542,962 | B2 | 4/2003 | Kodama et al. | |
| 7,069,400 | B2 * | 6/2006 | Takeda et al. ..... | 711/161 |
| 7,171,395 | B1 * | 1/2007 | Belgardt et al. .... | 1/1 |
| 8,006,054 | B2 * | 8/2011 | Ishii et al. ........ | 711/162 |
| 8,015,377 | B2 * | 9/2011 | Kano .............. | 711/162 |
| 8,117,167 | B2 * | 2/2012 | Kitamura et al. ... | 707/640 |
| 2003/0088594 | A1 * | 5/2003 | Hamadi ........... | 707/205 |
| 2004/0080558 | A1 * | 4/2004 | Blumenau et al. .. | 347/19 |
| 2004/0193625 | A1 * | 9/2004 | Sutoh et al. ...... | 707/100 |
| 2008/0040461 | A1 * | 2/2008 | Kumbalimutt et al. | 709/221 |

FOREIGN PATENT DOCUMENTS

| | | |
|---|---|---|
| JP | 2002-063055 | 2/2002 |
| JP | 2002-358165 A | 12/2002 |

OTHER PUBLICATIONS

Budhiraga,N. etal., Primary-Backup Protocols: Lower Bounds and Optimal Implementations, 1992, Cornell Univ. Ithaca NY, 21 pages.*
Olivera, R. etal., Primary-backup replication: from a time-free protocol to a time-based implementation, 2001, Proceedings of 20th IEEE Symposium on Reliable Distributed Systems. 13 pages.*
Japan Patent Office office action for patent application JP2008-207708 (Jul. 6, 2010).

* cited by examiner

*Primary Examiner* — Eric Coleman
(74) *Attorney, Agent, or Firm* — Kilpatrick Townsend & Stockton LLP

(57) ABSTRACT

Provided is a data processing system which includes: a first computer for receiving a processing request for a task processing, executing the processing, and holding data used therein; and a second computer for holding a duplicate of the data held in the first computer, halting the first computer if the first computer is determined to be halted, and receiving and processing the processing request. The first computer receives at least an update request as the processing request including request identification information to which unique numbers assigned to the individual processing requests in an ascending order are allocated, updates the held data, and transmits the update request including the request identification information to the second computer. The second computer stores a transmitted reference request and the update request as the processing requests, and processes the processing requests in an ascending order of the unique numbers included in the individual processing requests.

8 Claims, 16 Drawing Sheets

| | 302 | 303 | 304 | 305 | 306 |
|---|---|---|---|---|---|
| CLIENT IDENTIFIER | TRANSMISSION SOURCE IP ADDRESS | REQUEST TYPE (UPDATE/REFERENCE) | TRANSMISSION TIME | REQUEST CONTENT | |
| Client 01 | 192.168.1.100 | UPDATE | 11:10:24.001 | ... | 301A |
| Client 02 | 192.168.1.200 | UPDATE | 11:10:27.011 | ... | 301B |
| Client 01 | 192.168.1.200 | REFERENCE | 11:10:28.004 | ... | 301C |
| Client 02 | 192.168.1.200 | REFERENCE | 11:10:28.024 | ... | 301D |

*FIG. 3*

| 402 | 302 | 303 | 304 | 305 | 306 |
|---|---|---|---|---|---|
| PROCESS QUEUE SERIAL NO. | CLIENT IDENTIFIER | TRANSMISSION SOURCE IP ADDRESS | REQUEST TYPE (UPDATE/REFERENCE) | TRANSMISSION TIME | REQUEST CONTENT |
| 6 | Client 01 | 192.168.1.100 | UPDATE | 11:10:24.001 | ... |
| 7 | Client 02 | 192.168.1.200 | UPDATE | 11:10:27.011 | ... |

| 402 | 403 | 404 | 405 | 406 | | | |
|---|---|---|---|---|---|---|---|
| PROCESS QUEUE SERIAL NUMBER | COMMIT SERIAL NUMBER | ROW ID | OPERATION TYPE | ROW DATA | | | |
| 6 | 6 | 1 | UPDATE | A' | B' | ... | C' |
| 8 | 7 | 2 | DELETION | / | / | / | / |
| 7 | 8 | 100 | INSERTION | X | Y | ... | Z |
| : | : | : | : | : | : | ... | : |

| | 503 | 504 | 504 | 504 | 501 |
|---|---|---|---|---|---|
| | ROW ID | COLUMN 1 | COLUMN 2 | | COLUMN n |
| | 1 | A | B | ... | C |
| | 2 | D | E | ... | F |
| | : | : | : | ... | : |

FIG. 5A

| 502 |
|---|
| COMMIT SERIAL NUMBER |
| 5 |

FIG. 5B

| 602 | 603 | 604 | 605 | 124 |
|---|---|---|---|---|
| SERVER IDENTIFIER | IP ADDRESS | STATUS | REFERENCE PROCESS ENABLED/DISABLED | |
| Server 01 | 192.168.1.11 | ACTIVE SYSTEM | DISABLED |
| Server 02 | 192.168.1.12 | STANDBY SYSTEM | ENABLED |
| Server 03 | 192.168.1.13 | STANDBY SYSTEM | ENABLED |
| : | : | : | |

FIG. 6

| 702 | 703 | 704 | 705 | 706 | 125 |
|---|---|---|---|---|---|
| SERVER IDENTIFIER | STATUS | CPU USAGE RATE | MEMORY USAGE RATE | NETWORK USAGE RATE | |
| Server 01 | ACTIVE SYSTEM | 40% | 40% | 20% |
| Server 02 | STANDBY SYSTEM | 30% | 20% | 10% |
| Server 03 | STANDBY SYSTEM | 20% | 20% | 10% |
| : | : | : | : | : |

FIG. 7

DATA PROCESSING METHOD, CLUSTER SYSTEM, AND DATA PROCESSING PROGRAM

CLAIM OF PRIORITY

The present application claims priority from Japanese patent application JP2008-207708 filed on Aug. 12, 2008, the content of which is hereby incorporated by reference into this application.

BACKGROUND OF THE INVENTION

This invention relates to a computer system including an active system and a standby system, and more particularly, to a technology which provides data managed by the computer system.

In a conventional cluster system which duplicates process data using computers in an active system and a standby system as well as a shared disk of a nonvolatile recording medium, when a failure occurs in the active system, the standby system accesses the process data held on the nonvolatile recording medium to switch the systems and recover the failure, thereby allowing a process to be continued.

In recent years, a cluster system has appeared which uses, to improve an I/O processing speed and hold process data, a volatile memory as a volatile recording medium instead of using the shared disk of the nonvolatile recording medium. In such a cluster system, the process data held in the volatile memory cannot be shared between the active system and the standby system, and hence the process data is lost in the event of a failure in the active system. To prevent this, the active system transfers update information on the process data held in the volatile memory to the standby system, while the standby system copies the update information received thereby in the process data held in the volatile memory of its own to duplicate the process data, and ensures redundancy. In the case where high failure tolerance is required, a plurality of the standby systems are provided, and the active system simultaneously transfers the process data to the plurality of standby systems.

However, in the cluster system having the standby system as a system switching destination in the event of a failure, the standby system is not efficiently used for data processing while the active system normally operates. This leads to the problem of low resource usability.

As a solution to the problem, in addition to the application which uses the standby system as the switching destination in the event of a failure, it can be considered to cause the plurality of standby systems to process a reference request, and cause the active system to process an update request so as to improve the data processing performance of the entire system, and efficiently use the resources of the standby systems. JP 2002-63055 A discloses a technology which distributes, in a cluster system where data is stored on a volatile recording medium, an update request and a reference request to a plurality of computers so that the update request and the reference request are processed thereby.

SUMMARY OF THE INVENTION

According to the technology disclosed in JP 2002-63055 A, an assignment device transmits an input telegraphic message for the reference request to all computers including a computer for reference which is high in referencing performance, and a computer for updating which is low in referencing performance to cause the computers to execute a reference process. Consequently, all the update requests and all the reference requests are processed in the computer for updating. In a system where update or reference is frequently requested, the deterioration of the referencing performance in the computer for updating may cause the deterioration of the processing performance of the entire system. In addition, in the case where process data in the computer for updating is stored in the volatile memory, consideration has not been given to a method for process data duplication in the event of a failure.

It is an object of this invention to improve, in a cluster system where data is stored in a volatile memory, processing efficiency for an update process in an active system by assigning a reference request to a standby system, and efficiently use computer resources in the standby system.

The representative aspects of this invention are as follows. That is, there is provided a data processing method in a cluster system comprising: a first computer for receiving a processing request for a task processing, executing the task processing, and holding data used therein; and a second computer for holding a duplicate of the data held in the first computer, halting the first computer if the first computer is determined to be halted, and receiving and processing the processing request, the data processing method including the steps of: receiving, by the first computer, at least an update request as the processing request containing including request identification information to which unique numbers assigned to the individual processing requests in an ascending order are allocated; updating, by the first computer, the held data; transmitting, by the first computer, the update request including containing the request identification information to the second computer; receiving, by the second computer, a reference request including containing the unique number and transmitted thereto and the update request transmitted from the first computer; storing, by the second computer, the reference request and the update request as the processing requests; and processing, by the second computer, the processing requests in an ascending order of the unique numbers contained included in the individual processing requests which have been received and stored.

According to the embodiment of this invention, by causing the computer (second computer) in the standby system to execute a reference process for data managed in the cluster system to reduce a load on the computer (first computer) in the active system, it is possible to improve processing efficiency for an update process, and effectively use the computer resources in the standby system.

BRIEF DESCRIPTION OF THE DRAWINGS

The present invention can be appreciated by the description which follows in conjunction with the following figures, wherein:

FIG. 3 is a diagram illustrating an example of an input telegraphic message transmitted by any one of the clients to the cluster system according to the first embodiment of this invention;

FIG. 4A is a diagram illustrating an example of a received input telegraphic message stored in a temporary registration queue buffer and a process queue buffer according to the first embodiment of this invention;

FIG. 4B is a diagram illustrating an example of an update information stored in an update information buffer according to the first embodiment of this invention;

FIG. 5A is a diagram illustrating an example of database data stored in a process data according to the first embodiment of this invention;

FIG. 5B is a diagram illustrating an example of a table in which a commit serial number is stored according to the first embodiment of this invention;

FIG. 6 is a diagram illustrating an example of a status management table according to the first embodiment of this invention;

FIG. 7 is a diagram illustrating an example of a resource management table according to the first embodiment of this invention;

DETAILED DESCRIPTION OF THE PREFERRED EMBODIMENTS

Hereinbelow, embodiments of this invention will be described with reference to the drawings.

(First Embodiment)

Figure 1:
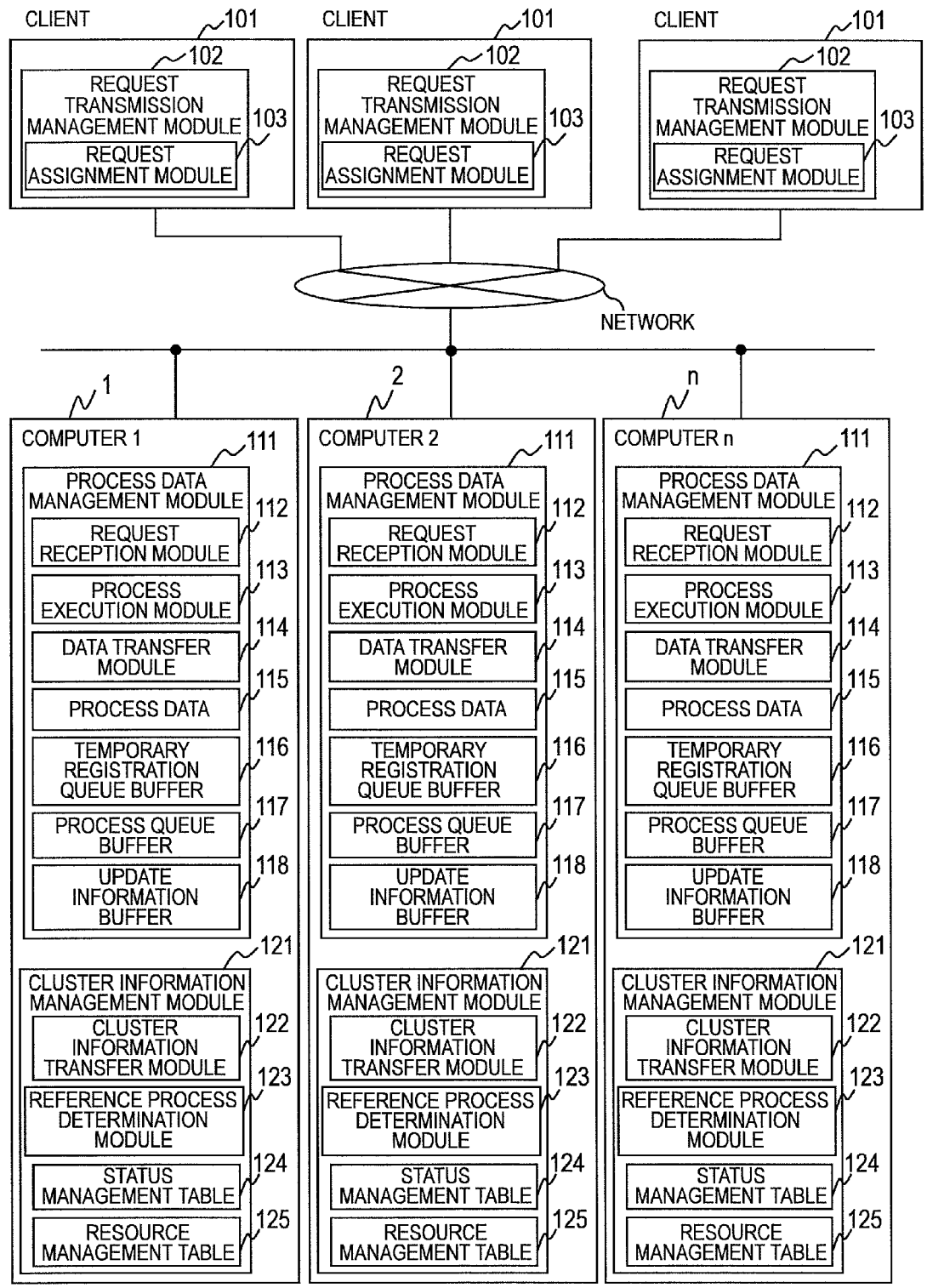
FIG. 1 is a block diagram illustrating an example of a cluster system according to a first embodiment of this invention.

FIG. 1 is a block diagram illustrating an example of a cluster system according to a first embodiment of this invention.

The cluster system according to the first embodiment of this invention includes a computer 1 in an active system, and a plurality of computers 2 to n in standby systems. A plurality of clients 101 transmit processing requests to the cluster system. The computers (1 to n) in the active system and the standby systems and the clients are coupled via a network. Hereinafter, the computer 1 in the active system, and each of the computers 2 to n in the standby systems will be simply referred to as the "active system", and the "standby system", respectively, unless particularly specified.

Each of the clients 101 includes a request transmission management module 102 which transmits an input telegraphic message 301 requesting a process of the cluster system. The request transmission management module 102 receives a response indicating that the input telegraphic message 301 has been received by the cluster system. The request transmission management module 102 also receives the result of processing the input telegraphic message 301.

The request transmission management module 102 further includes a request assignment module 103 having the function of assigning a request to a request destination based on the input telegraphic message 301. Specifically, when the input telegraphic message 301 is an update request, the request assignment module 103 transmits the input telegraphic message 301 to all the plurality of computers in the active system and the standby systems using multicast communication. When the input telegraphic message 301 is for a reference process, the request assignment module 103 transmits the input telegraphic message 301 to the computer in the active system, or to any one of the computers 2 to n in the standby systems. Further, in order to recognize whether each of the computers belongs to the active system or any one of the standby systems, the request assignment module 103 references a status management table 124 in any one of the computers in the active system and the standby systems of the cluster system.

Each of the computers in the active system and the standby systems includes a process data management module 111 and a cluster information management module 121. The individual computers in the active system and the standby systems have the same structure. When a process in the active system is taken over by any one of the standby systems as a result of system switching due to a failure, the standby system that has taken over the process thereafter operates as the active system.

The process data management module 111 includes a request reception module 112, a process execution module 113, a data transfer module 114, process data 115, a temporary registration queue buffer 116, a process queue buffer 117, and an update information buffer 118. The request reception module 112, the process execution module 113, and the data transfer module 114 are programs executed by a CPU 21 of the computer, which will be described later.

Hereinbelow, a description will be given of processes executed by the individual components of the process data management module 111. The description will be given separately to the case where the processes are executed in the active system, and to the case where they are executed in any one of the standby systems.

First, the outline of the processes in the active system will be described. The request reception module 112 in the active system receives the input telegraphic message 301 transmitted from the request assignment module 103 of the client 101.

When the input telegraphic message 301 is an update request, the request reception module 112 further receives a reception completion notification for the input telegraphic message 301 from any one of the standby systems. To the received input telegraphic message 301, the request reception module 112 imparts a unique process queue serial number 402, and stores the input telegraphic message 301 as received input telegraphic message 411 in the process queue buffer 117.

The process queue buffer 117 is a region where the received input telegraphic message 411 is stored. The process execution module 113 updates or references the process data 115 from the received input telegraphic message 411 stored in the process queue buffer 117. The process execution module 113 further stores update information 401 obtained by updating the process data 115 in the update information buffer 118. The process execution module 113 acquires the resource use status of the own system, and stores the resource use status in a resource management table 125.

The update information buffer 118 is a region where the update information 401 on the process data 115 is stored. The process data 115 is data necessary for the processes executed by the process execution module 113. For a higher-speed process, the process data 115 is stored in a volatile memory. For the process execution module 113, the process data 115, and the update information buffer 118, an application different from that used for the process data management module 111, such as a database management system, may also be used.

The process data management module 111 further includes the data transfer module 114 which transmits data to the standby systems. The data transfer module 114 transfers the update information 401 resulting from the updating by the process execution module 113 to the standby systems. In the first embodiment of this invention, the update information 401 of the process data 115 stored in the volatile memory of the active system is transferred to each of the standby systems, and copied in the process data 115 in the volatile memory of the standby system computer.

A method of transferring the update information 401 by the data transfer module 114 may be one of unicast transmission which individually transmits data to each of the computers, and multicast transmission which simultaneously transmits data to all the computers in the system. In the case of using the multicast transmission, the amount of transferred data can be reduced.

The data transfer module 114 may also, e.g., compress data prior to or during transfer depending on an amount of data transfer to suppress the amount of transfer, or use a plurality of transfer paths to preferentially use the transfer paths instead of the use thereof to other processes.

Additionally, in the first embodiment of this invention, the data transfer module 114 synchronously transfers the update information 401 to the other systems. The synchronous transfer mentioned herein indicates that the active system has received reception of the update information 401 from each of the standby systems. In the case where the update information 401 is transferred asynchronously, a part of the update information 401 may be lost in the event of occurrence of a failure. Accordingly, in the case where the system tolerates a loss of a part of the update information 401, such as in the case where data is reproducible, or as long as retransmission of the update information 401 from a higher-order system is allowed, asynchronous transfer is applicable. In the case of the asynchronous transfer, after transferring the update information 401 to the other systems, the active system can continue the process being executed therein without awaiting the completion of reception. This allows an improvement in processing performance.

As described above, in the cluster system according to the first embodiment of this invention, the reference request is processed by the standby systems. However, in the case of causing the standby system to process the reference request in the system where data is stored in the volatile memory, the following problem may occur.

On receiving the update request, the active system synchronously transfers the update information to all the standby systems, and transmits the result of the process to a request source. In the synchronous transfer in this case, the active system waits till the response indicating that each of the standby systems has completed reception of the update information is given, and the active system does not wait till the update information is copied in the process data in the volatile memory of the standby system. Accordingly, when the update request and the reference request are continuously transmitted from the same request source (client 101), and when the copy in the process data in response to a previously issued update request is delayed, old data before the copy may be referenced.

Hereinbelow, the outline of the processes in the standby systems will be described. In the case of the same process as in the active system, the description thereof will be omitted.

The request reception module 112 in each of the standby systems receives the input telegraphic message 301 transmitted by the request assignment module 103 of the client 101. When the input telegraphic message 301 is for an update process, the request reception module 112 transmits a reception completion notification for the input telegraphic message 301 to the active system. When the input telegraphic message 301 that has been received is an update request, the request reception module 112 imparts the process queue serial number 402 which has been allocated in the request reception module 112 in the active system to the input telegraphic message 301, and then stores the input telegraphic message 301 as the received input telegraphic message 411 in the temporary registration queue buffer 116.

On the other hand, when the input telegraphic message 301 is a reference request, the request reception module 112 in the standby system retrieves an update request from the same client from the received input telegraphic message 411 that has been stored in the temporary registration queue buffer 116 before the reception of the reference request. When there is the update request from the same client, the request reception module 112 waits till the received input telegraphic message 411 from the same client moves to the process queue buffer 117, and then stores the input telegraphic message 301 in the process queue buffer 117.

In the case of a system where the respective results of referencing in the active system and the standby system need to match, the request reception module 112 in the standby system waits till all the input telegraphic messages 301 stored in the temporary registration queue buffer 116 are stored in the process queue buffer 117. In other words, in the case where there are the update requests processed in the active system before the standby system receives the input telegraphic message for the reference request, the reference request is processed after all the update requests are completed.

As a result of retrieving the update request from the same client, when the update request from the same client is not contained in the temporary registration queue buffer 116, the request reception module 112 in the standby system may also store the reference request in the process queue buffer 117 without waiting.

The temporary registration queue buffer 116 is a region where the received input telegraphic message 411 for an update request is stored in the standby system.

The process execution module 113 references the process data 115 from the received input telegraphic message 411 stored in the process queue buffer 117. When the received input telegraphic message 411 is an update request, the process execution module 113 copies the update information 401 stored in the update information buffer 118 in the process data 115. The process execution module 113 further acquires the resource use status of the own system, and stores the resource use status in the resource management table 125. The process data 115 is data necessary for the processes executed by the process execution module 113.

The data transfer module 114 receives the update information 401 processed by the process execution module 113 in the active system. The data transfer module 114 further stores in the update information buffer 118 the update information 401 in the active system that has been received, and moves the received input telegraphic message 411 stored in the temporary registration queue buffer 116 which is corresponding to the update information 401 to the process queue buffer 117.

Thus, through the processing of the reference request in the standby system, even when the reference request is transmitted continuously to the update request, it is possible to reference the process data 115 after it is updated.

Subsequently, the cluster information management module 121 will be described. The cluster information management module 121 has the same function in the active system and the standby systems.

The cluster information management module 121 includes a cluster information transfer module 122, a reference process determination module 123, the status management table 124, and the resource management table 125.

The cluster information transfer module 122 transfers cluster information to the other systems, or receives cluster information transferred from the other systems. The status management table 124 stores the operating status of each of the computers. The resource management table 125 stores the usage of the resources of each of the computers. The reference process determination module 123 references the resource management table 125 when the own system is the active system, determines whether or not a reference process is to be executed, and stores the result of the determination in the status management table 124.

Hereinbelow, a description will be given of an operation of the cluster information management module in association with the individual processes in the active system and the standby systems.

First, the cluster information management module 121 monitors the process data management module 111 to detect a process failure in the own system, and allows the status to be reported to the computers in the other systems. When a failure occurs in the active system, the cluster information management module 121 executes system switching to cause one of the operating standby systems to operate as the active system. The monitoring of the process data management module 111 may be performed by a method of detecting whether or not the resource usage can be measured through communication with the resource management table 125 representing the usage, or by a method of directly or indirectly monitoring the process data management module 111 through another communication. Further, the cluster information management module 121 in the active system compares the active system with each of the standby systems based on the resource usage rate in the resource management table 125, and changes the reference process determination in the status management table 124 to "Enabled" when a load on the standby system is higher than that on the active system to cause a reference process to be executed also in the active system. When the resource usage rate in any one of the standby systems is high, the cluster information management module 121 in the standby system changes the reference process determination in the status management table 124 to "Disabled" based on the resource usage rate in the resource management table 125, and causes another computer to execute the reference process.

Figure 2A:
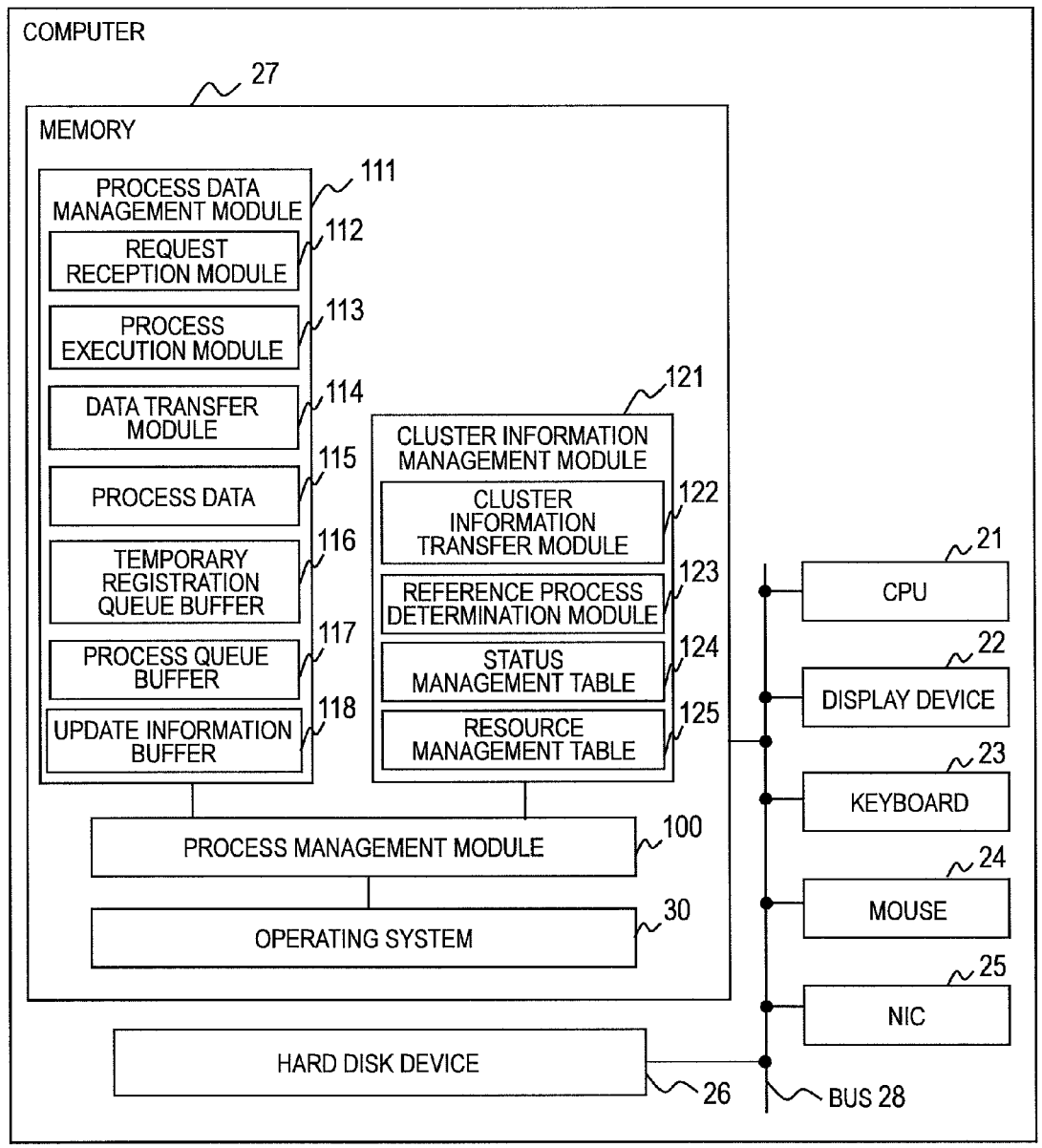
FIG. 2A is a diagram illustrating a hardware structure of each of computers according to the first embodiment of this invention.

FIG. 2A is a diagram illustrating a hardware structure of each of the computers according to the first embodiment of this invention.

As described above, the individual computers in the active system and the standby systems have the same structure. Each of the computers includes the CPU 21, a display device 22, a keyboard 23, a mouse 24, a network interface card (NIC) 25, a hard disk device 26, and a memory 27. The CPU 21, the display device 22, the keyboard 23, the mouse 24, the NIC 25, the hard disk device 26, and the memory 27 are coupled by a bus 28.

Each of the computers in the active system and the standby systems is coupled to the network via the NIC 25 to mutually communicate with the other computers.

The CPU 21 executes a program stored in the memory 27. The memory 27 stores the program executed by the CPU 21, and data necessary for the execution of the program. The memory 27 stores a process management module 100, an operating system 30, the process data management module 111, and the cluster information management module 121. As described above, the memory 27 is the volatile memory medium.

As described above with reference to FIG. 1, the process data management module 111 includes the request reception module 112, the process execution module 113, the data transfer module 114, the process data 115, the temporary registration queue buffer 116, the process queue buffer 117, and the update information buffer 118. The request reception module 112, the process execution module 113, and the data transfer module 114 are programs executed by the CPU 21.

As described above with reference to FIG. 1, the cluster information management module 121 includes the cluster information transfer module 122, the reference process determination module 123, the status management table 124, and the resource management table 125. The cluster information transfer module 122, and the reference process determination module 123 are programs executed by the CPU 21.

The process management module 100 is a program executed on the operating system 30. The programs included in the process data management module 111 and the cluster information management module 121 are invoked by the process management module 100. According to the programs included in the process data management module 111 and the cluster information management module 121, the process described with reference to FIG. 1 is executed.

The process data 115 is data used in a task processing. As described above with reference to FIG. 1, for the process data 115, an application different from that used for the process data management module 111, such as a database management system, may also be used. In this case, the database management system is stored in the memory 27.

As described above with reference to FIG. 1, the temporary registration queue buffer 116 is a region where the input telegraphic message 301 for an update request is stored in each of the standby systems. As described above with reference to FIG. 1, the process queue buffer 117 is a region where the input telegraphic message 301 is stored. As described above with reference to FIG. 1, the update information buffer 118 is a region where the update information 401 on the process data 115 is stored.

As described above with reference to FIG. 1, the status management table 124 stores the operating status of each of the computers. As described above with reference to FIG. 1, the resource management table 125 stores the resource usage of each of the computers.

The display device 22 displays various information such as the result of executing a task processing. The keyboard 23 and the mouse 24 receive an input from a user. The NIC 25 is coupled to the network. The hard disk device 26 stores the process data stored in the memory 27, the program loaded in the memory 27, and the like.

The hardware structure of the client 101 is the same as the hardware structure of the computer illustrated in FIG. 2A, and includes a CPU, a memory, an NIC, an input/output device, and the like. Each of the clients 101 may also be implemented by a program executed on a virtual computer.

Figure 2B:
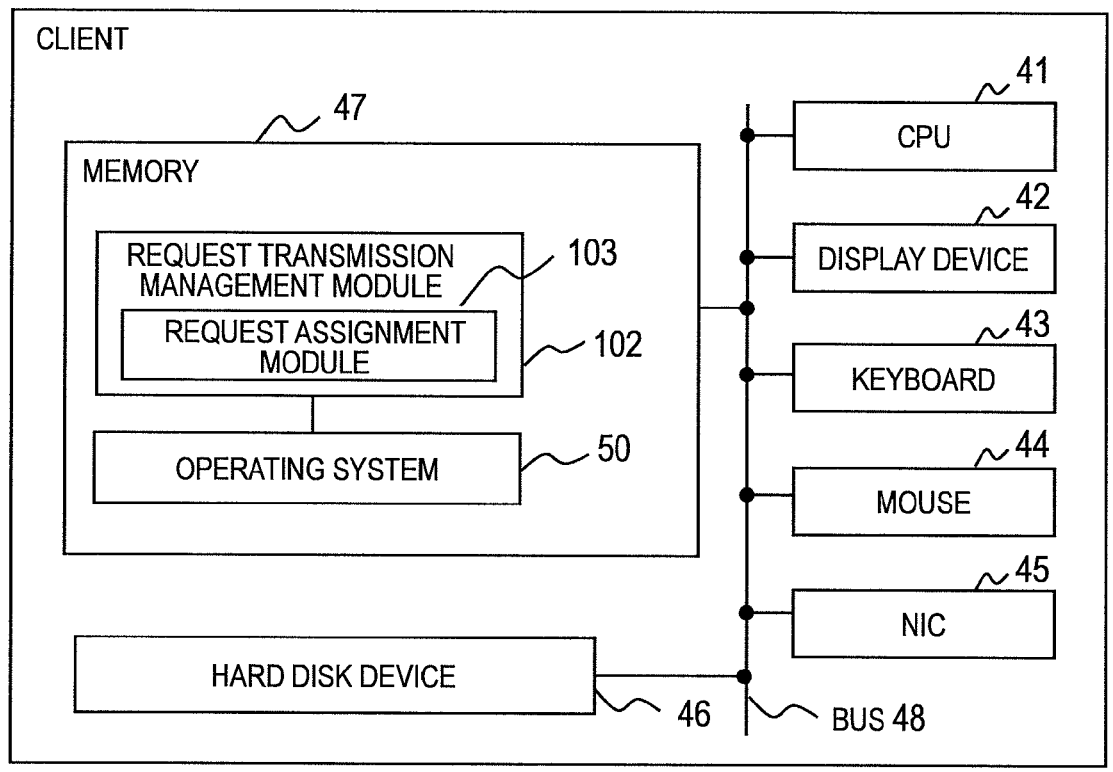
FIG. 2B is a diagram illustrating a hardware structure of each of clients according to the first embodiment of this invention.

FIG. 2B is a diagram illustrating a hardware structure of each of the clients according to the first embodiment of this invention.

Each of the clients includes a CPU 41, a display device 42, a keyboard 43, a mouse 44, a network interface card (NIC) 45, a hard disk device 46, and a memory 47. The CPU 41, the display device 42, the keyboard 43, the mouse 44, the NIC 45, the hard disk device 46, and the memory 47 are coupled by a bus 48.

Each of the clients is coupled to the network via the NIC 45 to communicate with each of the computers in the active system and the standby systems.

The CPU 41 executes a program stored in the memory 47. The memory 47 stores the program executed by the CPU 41, and data necessary for the execution of the program. The memory 47 stores the request transmission management module 102. As described above, the memory 27 is the volatile recording medium.

The request transmission management module 102 includes the request assignment module 103. As described above, the request assignment module 103 is a program executed on an operating system 50 by the CPU 41.

FIG. 3 is a diagram illustrating an example of the input telegraphic message 301 transmitted by any one of the clients 101 to the cluster system according to the first embodiment of this invention.

The input telegraphic message 301 includes a client identifier 302, a transmission source IP address 303, a request type 304, a transmission time 305, and a request content 306. When the input telegraphic message is described generally, it is expressed as the input telegraphic message 301. When an individual input telegraphic message is mentioned, it is expressed as an input telegraphic message 301A or the like.

The client identifier 302 is identification information which uniquely indicates the client 101 as a transmission source. The transmission source IP address 303 is information which indicates the IP address of the transmission source. The request type 304 is information which indicates whether the input telegraphic message 301 is an update request or a reference request.

The transmission time 305 is a time when the input telegraphic message 301 is transmitted. It is sufficient if the transmission time 305 is information which indicates the order of transmission by the client. For example, the transmission time 305 may be a serial number representing the order of transmission. The request content 306 is specific information for updating or referencing the process data 115.

FIG. 4A is a diagram illustrating an example of the received input telegraphic message 411 stored in the temporary registration queue buffer 116 and the process queue buffer 117 according to the first embodiment of this invention.

The received input telegraphic message 411 includes the process queue serial number 402, and structure information items 302 to 306 on the input telegraphic message 301. Received input telegraphic messages 411A and 411B illustrated in FIG. 4A correspond to the input telegraphic message 301A and an input telegraphic message 301B, respectively. When the received input telegraphic message is described generally, it is expressed as the received input telegraphic message 411. When an individual received input telegraphic message is mentioned, it is expressed as the received input telegraphic message 411A or the like.

As the process queue serial number 402, a serial number which is incremented every time the reception of the input telegraphic message 301 for an update request is completed in the request reception module 112 in the active system is stored.

FIG. 4B is a diagram illustrating an example of the update information 401 stored in the update information buffer 118 according to the first embodiment of this invention.

The update information 401 includes the process queue serial number 402, a commit serial number 403, a row ID 404, an operation type 405, and row data 406.

As the commit serial number 403, a serial number is allocated in units of a transaction in which an update request is processed by the process execution module 113 in the active system. When a plurality of rows are inserted, updated, or deleted in the same transaction, the same commit serial number is allocated.

The row ID 404 is an identifier for specifying a row subjected to an operation. The operation type 405 is the type of the operation executed with respect to the row subjected to the operation. In the operation type 405, the value of any one of "Insertion", "Update", and "Deletion" is stored. The row data 406 is the content of updated data. When the operation type 405 is "Insertion", data on an inserted row is stored. When the operation type 405 is "Update", the row data 406 after update is stored.

FIG. 5A is a diagram illustrating an example of database data 501 stored in the process data 115 according to the first embodiment of this invention.

The database data 501 includes a row ID 503, and columns 1 to n (504). The row ID 503 is a value which uniquely identifies each row. In the columns 1 to n (504), updated or referenced data is stored.

FIG. 5B illustrates an example of a table in which the commit serial number is stored according to the first embodiment of this invention.

A commit serial number 502 represents a value which indicates the order in which a transaction is committed, and is incremented every time a transaction is committed in the active system.

FIG. 6 is a diagram illustrating an example of the status management table 124 according to the first embodiment of this invention.

The status management table 124 is managed by the cluster information management module 121. The status management table 124 includes a server identifier 602, an IP address 603, a status 604, and a reference process enabled/disabled 605.

The server identifier 602 is identification information which uniquely identifies each of the computers. The IP address 603 is the IP address of each of the computers. The status 604 is information which indicates whether each of the computers belongs to the active system or any one of the standby systems.

In the reference process enabled/disabled 605, "Enabled" is stored when a reference process is to be executed. When a reference process is not to be executed, "Disabled" is stored.

FIG. 7 is a diagram illustrating an example of the resource management table 125 according to the first embodiment of this invention.

The resource management table 125 includes a server identifier 702, a status 703, a CPU usage rate 704, a memory usage rate 705, and a network usage rate 706. The resource management table 125 is managed by the cluster information management module 121.

The server identifier 702 is identification information which uniquely indicates each of the computers. The status 703 is information which indicates whether each of the computers belongs to the active system or any one of the standby systems.

The CPU usage rate 704, the memory usage rate 705, and the network usage rate 706 are information which indicates the CPU usage rate, the memory usage rate, and the network usage rate of each of the computers. The resources illustrated in FIG. 7 are only exemplary, and may also include another resource as long as it is a resource of the computers which affects the operation of the process data management module 111. In addition, not all the resources need to be included. It is sufficient if the usage rate of at least one resource is included.

Figure 8:
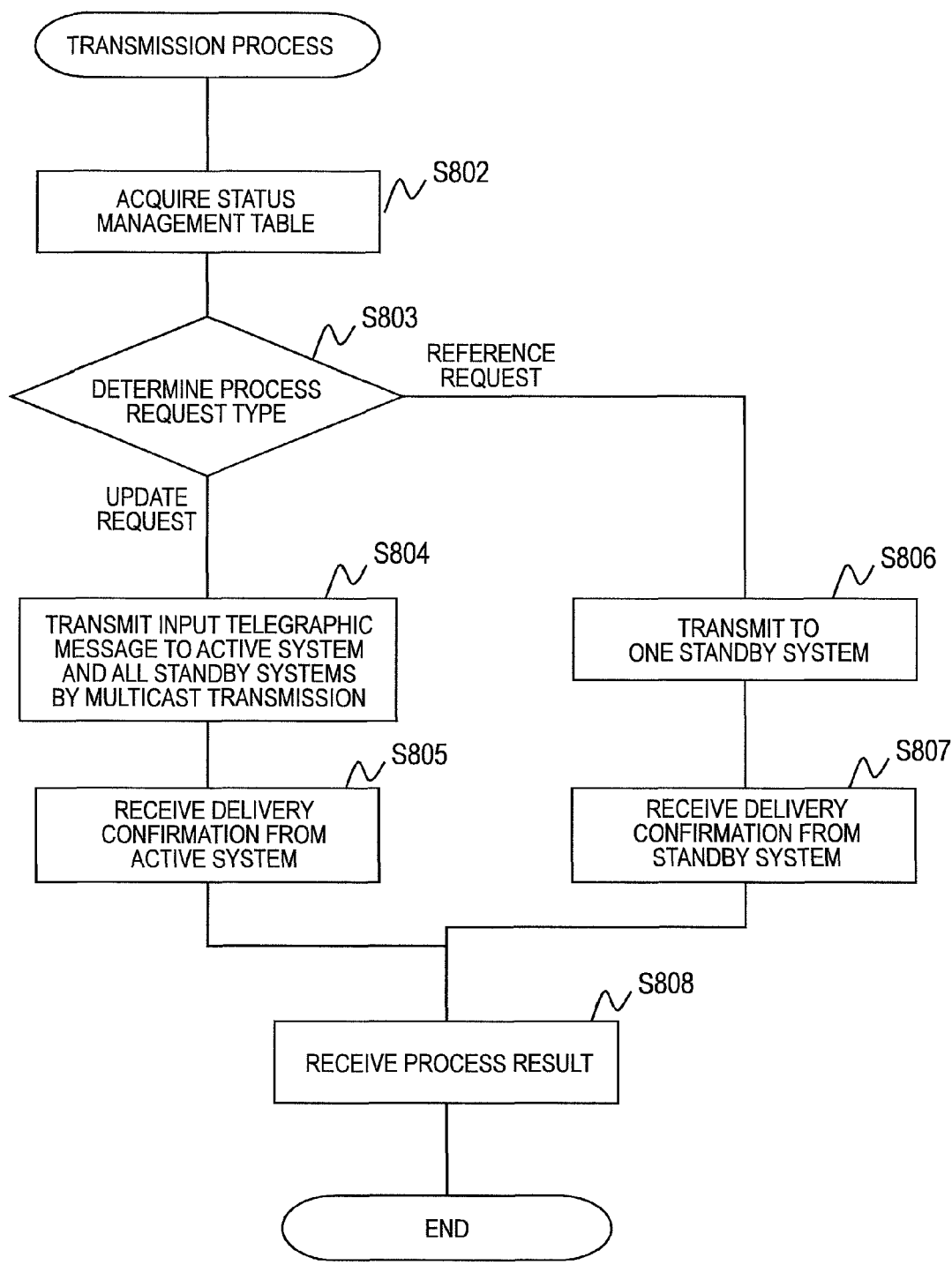
FIG. 8 is a flow chart illustrating the procedure of a process in any one of the clients which transmits a processing request to the cluster system according to the first embodiment of this invention.

FIG. 8 is a flow chart illustrating the procedure of a process in any one of the clients 101 which transmits a processing request to the cluster system according to the first embodiment of this invention.

This process is executed by the request transmission management module 102 when the client 101 requests a process of the cluster system.

First, the client 101 acquires the status management table 124 from any one of the computers in the cluster system (S802). The client 101 further references the acquired status management table 124, and acquires the IP addresses 603 of the active system and the standby systems. Instead of acquiring the status management table 124 on each transmission of a processing request, the status management table 124 may also be acquired in advance. In this case, it is necessary to periodically check update to the status management table 124.

Next, the client 101 causes the request assignment module 103 to determine the request type (S803). The request type is one of an update request and a reference request.

When the request type is an update request (if Step S803 results in "Update Request"), the client 101 performs multicast transmission of the input telegraphic message 301 to the active system and all the standby systems (S804).

The client 101 receives a delivery confirmation for the input telegraphic message 301 from the active system (S805). Thereafter, the client 101 receives the result of the process (S808), and ends this process.

When the request type is a reference request (if Step S803 in "Reference Request"), the client 101 selects any one of the computers in the active system and the standby systems whose value of the reference process enabled/disabled 605 is "Enabled" from the status management table 124, and transmits the input telegraphic message 301 (S806). A transmission destination may be distributed appropriately among the individual computers constituting the cluster system. For example, the transmission destination may be determined according to a round robin scheme, or determined according to the content of the task processing.

The client 101 then receives a delivery confirmation for the input telegraphic message 301 from the active system or the standby system as the transmission destination (S807). The client 101 further receives the result of the process (S808), and ends this process.

Figure 9:
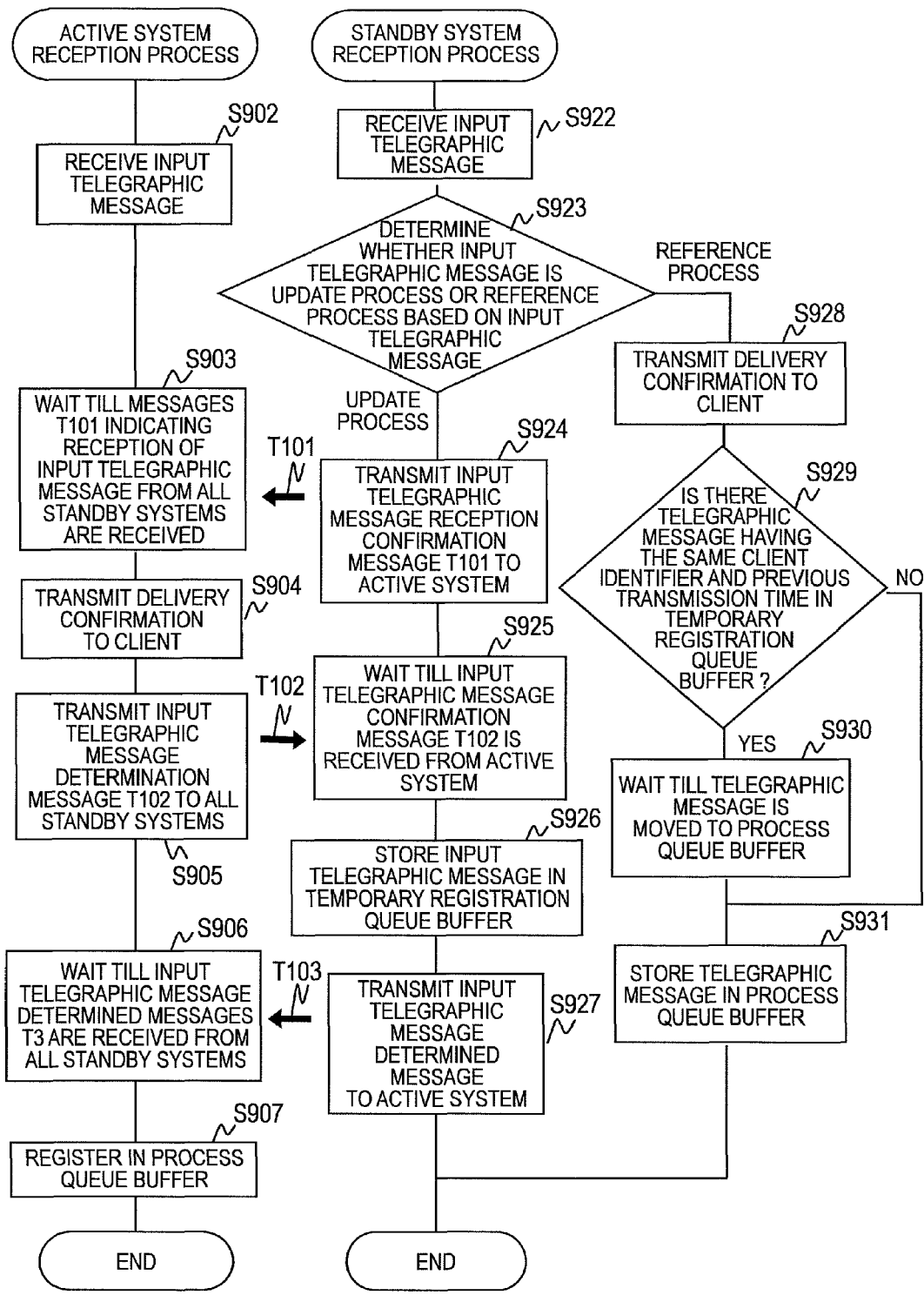
FIG. 9 is a flow chart illustrating the procedure of a process in a request reception module in each of an active system and standby systems which receives the input telegraphic message transmitted from any one of the clients according to the first embodiment of this invention.

FIG. 9 is a flow chart illustrating the procedure of a process in the request reception module 112 in each of the active system and the standby systems which receives the input telegraphic message 301 transmitted from any one of the clients 101 according to the first embodiment of this invention.

First, a description will be given of the processes in the active system.

On receiving the input telegraphic message 301 transmitted from the client 101 (S902), the CPU 21 in the active system waits till the request reception module 112 receives messages T101 reporting reception of the input telegraphic message 301 from all the standby systems (S903).

On receiving the messages T101 reporting reception of the input telegraphic message 301 from all the standby systems, the CPU 21 in the active system transmits a delivery confirmation for the input telegraphic message 301 to the client 101 (S904).

The CPU 21 in the active system then transmits determination notification messages T102 for the input telegraphic message 301 to all the standby systems (S905). Thereafter, the CPU 21 in the active system receives input telegraphic message determined messages T103 from all the standby systems (S906). After receiving the input telegraphic message determined messages T103 from all the standby systems, the CPU 21 stores the input telegraphic message 301 as the received input telegraphic message 411 in the process queue buffer 117 (S907), and ends this process.

Next, a description will be given of the process in the standby systems. In the following description, the procedure of the process in one of the standby systems is described, but the procedure of the process in each of the other standby systems is the same.

On receiving the input telegraphic message 301 transmitted from the client 101 (S922), the CPU 21 in the standby system determines whether the input telegraphic message 301 is an update request or a reference request based on the request type 304 of the input telegraphic message 301 (S923).

When the input telegraphic message 301 transmitted from the client 101 is an update request (if Step S923 in "Update Process"), the CPU 21 in the standby system transmits the message T101 reporting completion of reception of the input telegraphic message 301 to the active system (S924). Thereafter, the CPU 21 waits till the determination notification message T102 for the input telegraphic message 301 is transmitted from the active system (S925).

On receiving the determination notification message T102 for the input telegraphic message 301 from the active system, the CPU 21 in the standby system is ensured of the reception of the input telegraphic message 301 in all the active system and the standby systems, and stores the input telegraphic message 301 as the received input telegraphic message 411 in the temporary registration queue buffer 116 (S926). In the event of occurrence of system switching due to a failure, the received input telegraphic message 411 registered in the temporary registration queue buffer 116 is moved to the process queue buffer 117, and executed.

It should be noted that the process queue serial number 402 imparted in the active system cannot be acquired with the timing of reception of the input telegraphic message 301 corresponding to the update request by the standby system. Therefore, by causing the determination notification message T102 for the input telegraphic message 301 to include the process queue serial number 402 for the received input telegraphic message 411 corresponding to the update request, the process queue serial number 402 of the received input telegraphic message 411 is reported from the active system to the standby system.

The CPU 21 in the standby system then transmits the input telegraphic message determined message T103 to the active system (S927), and ends this process (S932).

When the input telegraphic message 301 transmitted from the client 101 is a reference request (if Step S923 in "Reference Process"), the CPU 21 in the standby system transmits a delivery confirmation for the input telegraphic message 301 to the client 101 (S928).

The CPU 21 in the standby system then determines whether or not the received input telegraphic message 411 having the same client identifier, and a transmission time previous to that of the input telegraphic message 301 received thereby is present in the temporary registration queue buffer 116 (S929).

When the corresponding received input telegraphic message 411 is present (if Step S929 in "YES"), the CPU 21 in the standby system waits till the corresponding received input telegraphic message 411 is moved to the process queue buffer 117 (S930). Thereafter, the CPU 21 stores the corresponding received input telegraphic message 411 in the process queue buffer 117 (S931), and ends this process.

When the corresponding received input telegraphic message 411 is not present (if Step S929 in "NO"), the CPU 21 in the standby system stores the input telegraphic message 301 transmitted from the client 101 in the process queue buffer 117 (S931), and ends this process.

It is also possible to cause each of the messages (T101, T102, and T103) transmitted/received in the active system or the standby system to include information which allows identification of the message, and transmit the message. For example, it is possible to cause the message to contain the client identifier and the transmission time of the input telegraphic message 301 or the received input telegraphic message 411. This allows identification of the message, and allows simultaneous activation of a plurality of the active system and standby system reception processes.

Figure 10:
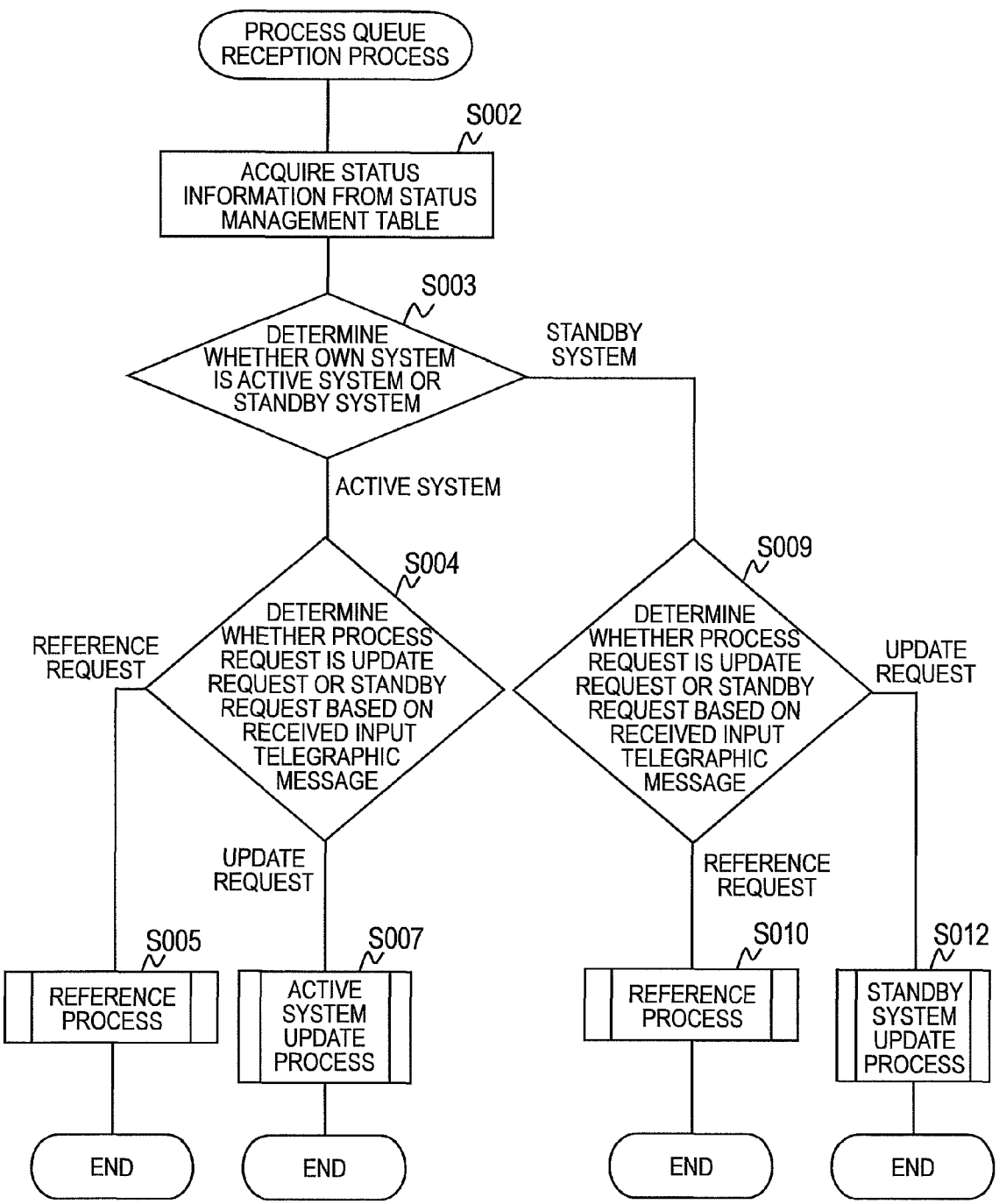
FIG. 10 is a flow chart illustrating the procedure of the processes in a process execution module according to the first embodiment of this invention.

FIG. 10 is a flow chart illustrating the procedure of the processes in the process execution module 113 according to the first embodiment of this invention.

This process is executed by the process execution module 113 when the received input telegraphic message 411 is stored in the process queue buffer 117 in any one of the active system and the standby systems.

When the received input telegraphic message 411 is stored in the process queue buffer 117, the CPU 21 in any one of the active system and the standby systems first references the status management table 124 in the own system, and acquires the status 604 (S002). Based on the acquired status 604, the CPU 21 determines whether the own system is the active system or the standby system (S003).

When the own system is the active system (if Step S003 in "Active system"), the CPU 21 determines whether the processing request is a reference request or an update request based on the request type 304 of the received input telegraphic message 411 (S004).

When the processing request is a reference request (if Step S004 in "Reference Request"), the CPU 21 executes a reference process (S005). The following is a specific description of the reference process. First, the CPU 21 references the process data 115 based on the request content 306 of the input telegraphic message 301, and transmits the result of the process to the client 101. Then, the CPU 21 deletes the input telegraphic message 301 stored in the process queue buffer 117 in the own system.

On the other hand, when the processing request is an update request (if Step S004 in "Update Request"), the CPU 21 executes an active system update process (S007). The active system update process will be described later in detail with reference to FIG. 11.

When the own system is the standby system (if Step S003 in "Standby System"), the CPU 21 determines whether the processing request is a reference request or an update request based on the request type 304 of the received input telegraphic message 411 (S009).

When the processing request is a reference request (if Step S009 in "Reference Request"), the CPU 21 executes a reference process (S010). The reference process in S010 is the same as the reference process in S005. On the other hand, when the processing request is an update request (if Step of S009 in "Update Request"), the CPU 21 executes a standby system update process (S012). The standby system update process will be described later in detail with reference to FIG. 12.

To collectively describe the active system and standby system processes, the foregoing processes have been described using, as an example, the procedure in which the process execution module 113 references the status management table 124 in each of the processes. However, when the status of the system is not changed, the process (S002) of referencing the status management table 124, and the process (S003) of determining the status of the system may also be omitted. For example, only when the status of the system of each of the computers is such that a failure occurs in the active system, and system switching is performed, the processes in S002 and S003 may be executed appropriately.

Figure 11:
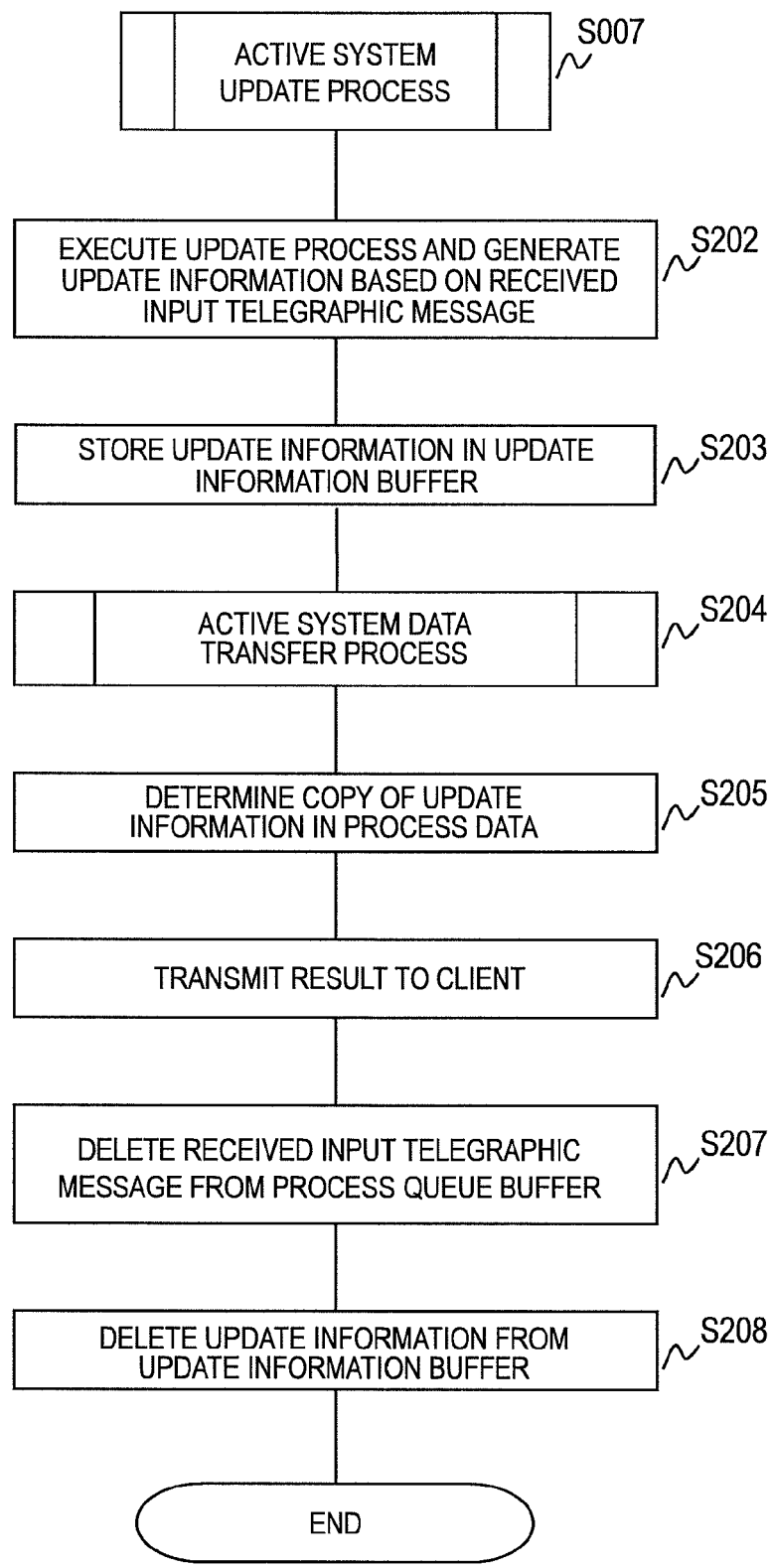
FIG. 11 is a flow chart illustrating the procedure of update process in the active system according to the first embodiment of this invention.

FIG. 11 is a flow chart illustrating the procedure of the update process (S007) in the active system according to the first embodiment of this invention.

The CPU 21 in the active system first updates the process data 115 in the active system based on the request content 306 of the input telegraphic message 301. Further, the CPU 21 generates the update information 401 to be transmitted to each of the standby systems (S202). At this time, to the update information 401, the process queue serial number corresponding to the input telegraphic message 301, and the commit serial number 403 which is incremented in units of a transaction are imparted.

In the standby system, the update information 401 transmitted from the active system is copied in the process data 115 according to the order of the commit serial numbers 403. Therefore, to prevent the occurrence of an overlapping commit serial number or a missing commit serial number, it is necessary to perform an exclusive process in updating the commit serial number 403 in the active system. By performing the exclusive process in updating the commit serial number 403, even when a plurality of the active system update processes (S007) are simultaneously executed, it is possible to ensure the consistency of the order of performing copy in the process data 115 in the active system and the standby system.

Then, the CPU 21 stores the update information 401 in the update information buffer 118 (S203). Further, the CPU 21 executes the active system data transfer process of transmitting the update information 401 to the data transfer module 114 in all the standby systems (S204).

The CPU 21 determines the update to the process data 115 and the update to the commit serial number 502 which are executed in the process in S202 (S205). Thereafter, the CPU 21 transmits the result of the process to the client 101 (S206). Further, the CPU 21 deletes the received input telegraphic message 411 stored in the process queue buffer 117 in the active system (S207). Finally, the CPU 21 deletes the update information 401 in the update information buffer 118 (S208), and ends this process.

Figure 12:
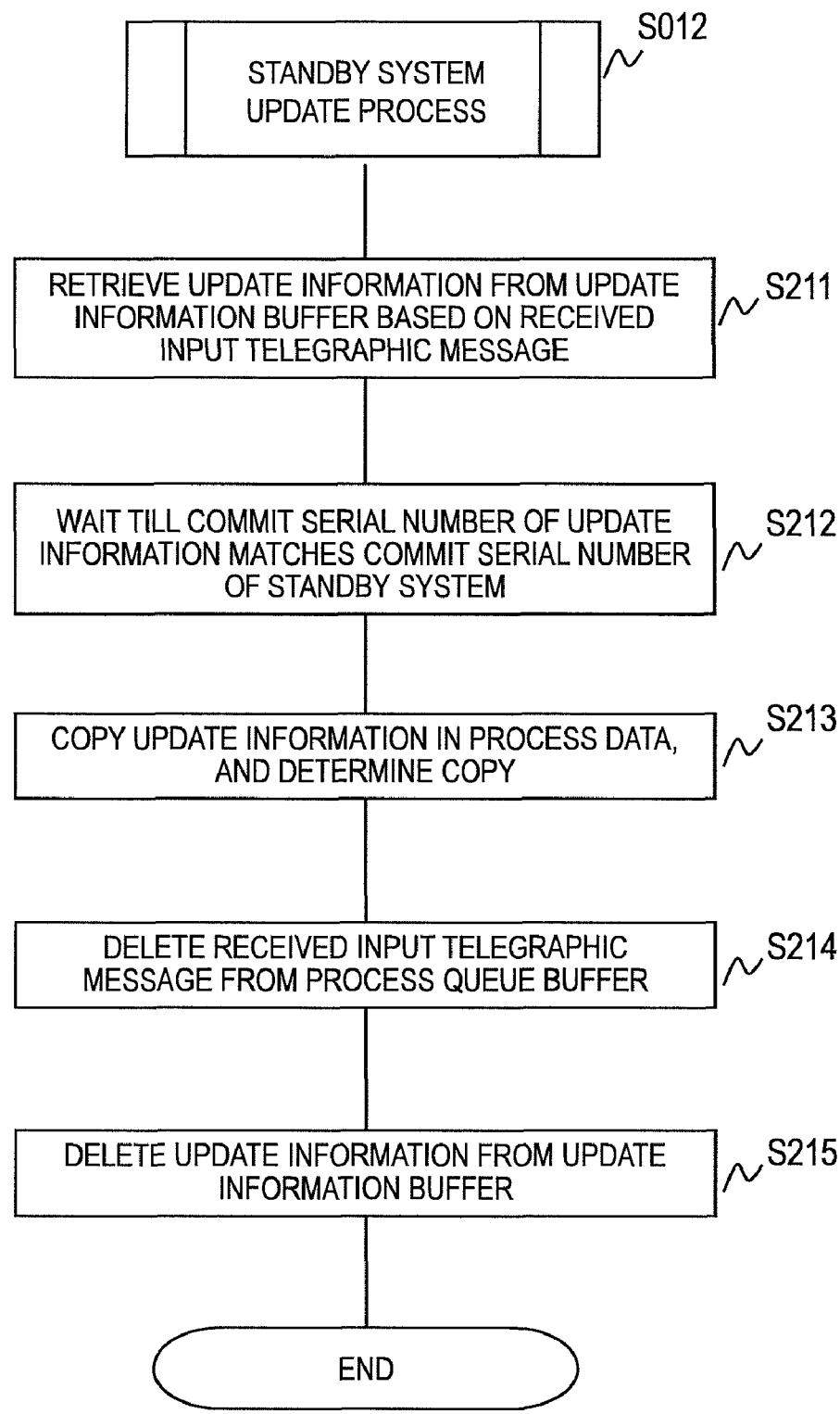
FIG. 12 is a flow chart illustrating the procedure of update process in the standby system according to the first embodiment of this invention.

FIG. 12 is a flow chart illustrating the procedure of the update process (S012) in the standby system according to the first embodiment of this invention.

The CPU 21 in the standby system retrieves, from the update information buffer 118, the update information 401 including the process queue serial number 402 having the same value as that of the process queue serial number 402 included in the received input telegraphic message 411 received in the standby system reception process of FIG. 9 (S211). When the commit serial number 403 of the corresponding update information 401 does not match the commit serial number 502 of the process data 115 in the standby system, the CPU 21 waits till the commit serial number 502 matches the commit serial number 403 (S212). The commit serial number 403 of the update information 401 does not match the commit serial number 502 of the process data 115 in the standby system when, e.g., an over-take occurs during the transfer of the update information 401 from the active system to the standby system, and there is a missing commit serial number 502 in the process data 115 in the standby system.

Then, the CPU 21 in the standby system copies the corresponding update information 401 in the process data 115, and determines the copy in the process data 115 and the update to the commit serial number 502 (S213). Thereafter, the CPU 21 deletes the received input telegraphic message 411 stored in the process queue buffer 117 in the standby system (S214). Finally, the CPU 21 deletes the update information 401 from the update information buffer 118 (S215), and ends this process.

Figure 13:
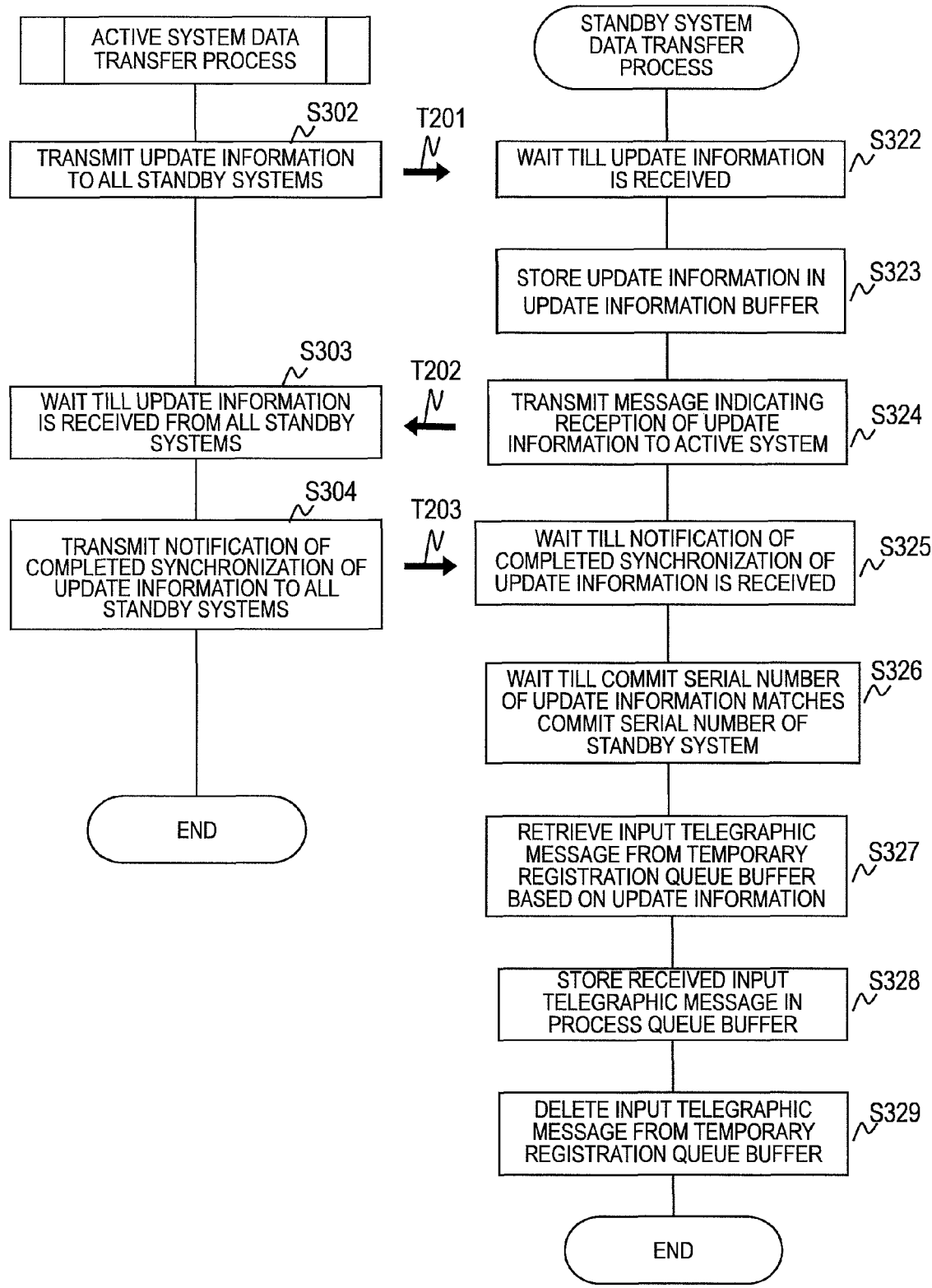
FIG. 13 is a flow chart illustrating the procedure of data transfer process in the active system, and the data transfer process in each of the standby systems according to the first embodiment.

FIG. 13 is a flow chart illustrating the procedure of the data transfer process in the active system (S204), and the data transfer process in each of the standby systems according to the first embodiment.

The data transfer process is executed by the data transfer module 114 in the active system or the standby system.

In the data transfer process in the active system (S204), the CPU 21 in the active system first transmits the update information 401 stored in the update information buffer 118 to each of the standby systems (S302, T201). As described above, the method for transfer of the update information 401 by the data transfer module 114 may be unicast transmission which individually transmits data to each of the computers, or multicast transmission which simultaneously transmits data to all the computers in the system. By the multicast transmission, an amount of transferred data can be reduced.

Then, the CPU 21 in the active system 21 waits till it receives the reception completion message T202 for the update information 401 from all the standby systems (S303). Thereafter, the CPU 21 transmits a notification T203 of completed synchronization of the update information 401 to all the standby systems (S304), and ends this process.

On the other hand, in the data transfer process in the standby system, the CPU 21 in the standby system waits till it receives the update information 401 (S322, T201). On receiving the update information 401, the CPU 21 stores the update information 401 in the update information buffer 118 (S323). Then, the CPU 21 transmits the reception completion message T202 for the update information to the active system (S324). Thereafter, the CPU 21 waits till the notification T203 of completed synchronization of the update information 401 is transmitted from the active system (S325).

On receiving the notification T203 of completed synchronization from the active system, the CPU 21 in the standby system waits till the commit serial number 403 of the update information 401 matches the commit serial number 502 of the process data 115 in the standby system (S326).

The CPU 21 in the standby system then retrieves, from the temporary registration queue buffer 116, the received input telegraphic message 411 including the same process queue serial number as the process queue serial number 402 of the update information 401 (S327). Thereafter, the CPU 21 stores the corresponding received input telegraphic message 411 in the process queue buffer 117 (S328). Further, the CPU 21 deletes the corresponding received input telegraphic message 411 from the temporary registration queue buffer 116 (S329), and ends this process.

Figure 14:
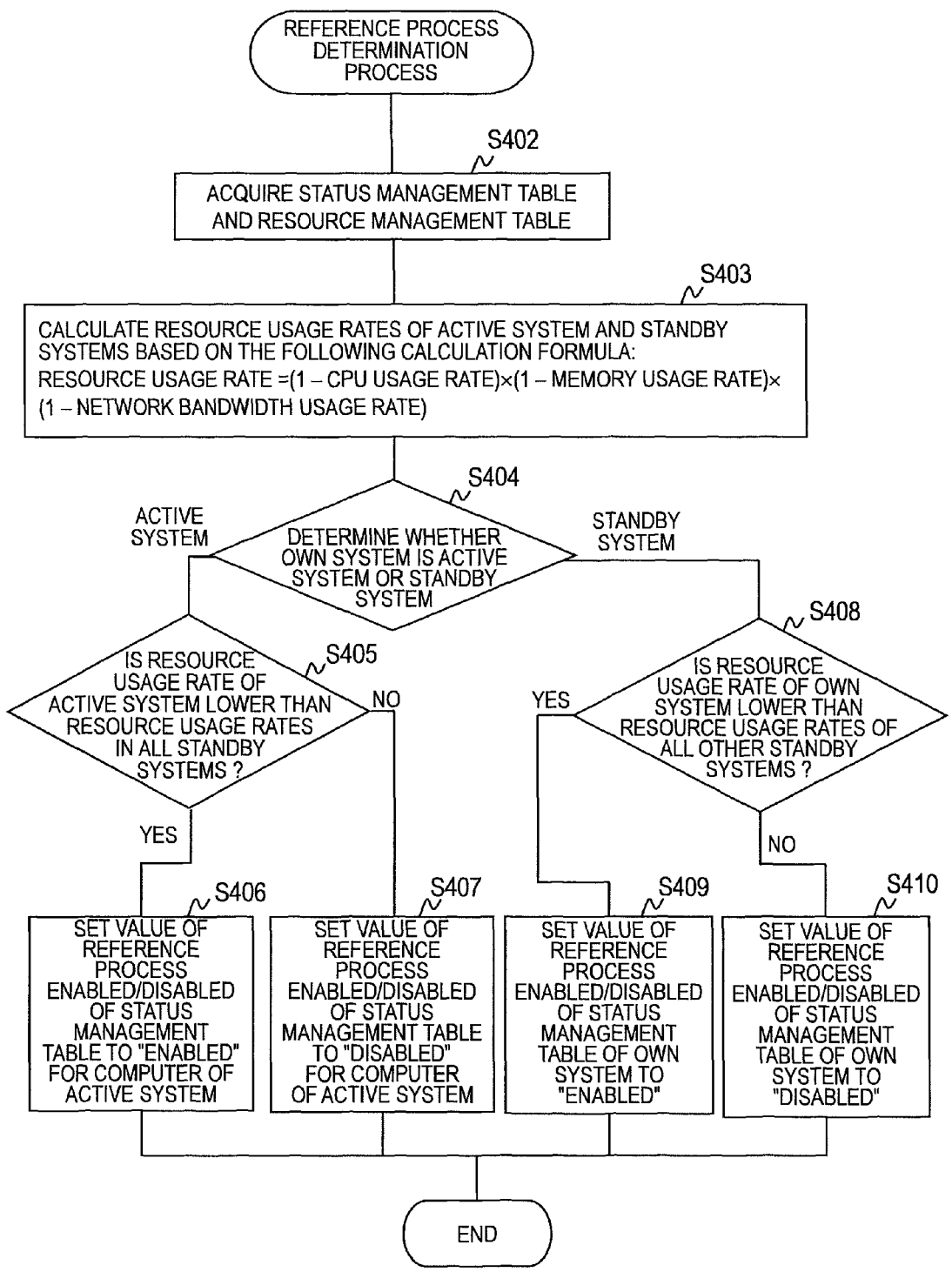
FIG. 14 is a flow chart illustrating the procedure of determining whether or not the reference process determination module of the cluster information management module performs a reference process according to the first embodiment of this invention.

FIG. 14 is a flow chart illustrating the procedure of determining whether or not the reference process determination module 123 of the cluster information management module 121 performs a reference process according to the first embodiment of this invention.

The CPU 21 in the active system or the standby system first acquires the status management table 124 and the resource management table 125 (S402).

The CPU 21 then acquires the resource usage rate from the acquired resource management table 125. In the first embodiment of this invention, the resource usage rate includes the CPU usage rate 704, the memory usage rate 705, and the network usage rate 706. Then, based on the following calculation formula, the CPU 21 calculates the resource usage rates in the active system and the standby system (S403):

Resource Usage Rate=(1−CPU Usage Rate)×(1−Memory Usage Rate)×(1−Network Usage Rate)

The calculation formula illustrated above is an example of a method of calculating the resource usage rate, and another calculation formula may also be used. It is also possible to merely use the value of the CPU usage rate, or likewise use the value of the memory usage rate or the network usage rate.

The CPU 21 references the status management table 124 of the own system, acquires the status 604, and determines whether the own system is the active system or the standby system (S404).

When the own system is the active system (if Step S404 in "Active system"), the CPU 21 determines whether or not the resource usage rate in the active system is lower than the resource usage rates in all the standby systems (S405).

When the resource usage rate in the active system is lower than the resource usage rates in all the standby systems (if Step S405 in "YES"), the CPU 21 sets the reference process enabled/disabled 605 in the status management table 124 to "Enabled" (S406). On the other hand, when there is the standby system having the resource usage rate lower than the resource usage rate in the active system (if Step S405 in "NO"), the CPU 21 sets the reference process enabled/disabled 605 in the status management table 124 to "Disabled" (S407).

As a method of comparing the resource usage rates in the active system and the standby systems, it is also possible to compare the resource usage rate in the active system with the mean value of the resource usage rates in all the standby systems, or otherwise pre-set the threshold value of a resource usage rate, and execute the reference process in the active system when the resource usage rate in the active system is lower than the threshold value, and the resource usage rate in each of the standby systems is higher than the threshold value.

On the other hand, when the own system is the standby system (if Step S404 in "Standby System"), the CPU 21 determines whether or not the resource usage rate in the own system is lower than the resource usage rates in all the other standby systems (S408).

When the resource usage rate of the own system is lower than the resource usage rates in all the other standby systems (if Step S408 in "YES"), the CPU 21 sets the reference process enabled/disabled 605 in the status management table 124 to "Enabled" (S409). On the other hand, when there is the standby system having the resource usage rate lower than the resource usage rate in the own system (if Step S408 in "NO"), the CPU 21 sets the reference process enabled/disabled 605 in the status management table 124 to "Disabled" (S410).

In the example illustrated in FIG. 14, the CPU, the memory, and the network have been described as examples of the resources. However, it is also possible to use other hardware elements used in each of the computers. In addition, the description has been given based on the individual usage rates as information representing the resource usage rate, but it is also possible to use an index which directly or indirectly represents the resource usage rate.

Figure 15A:
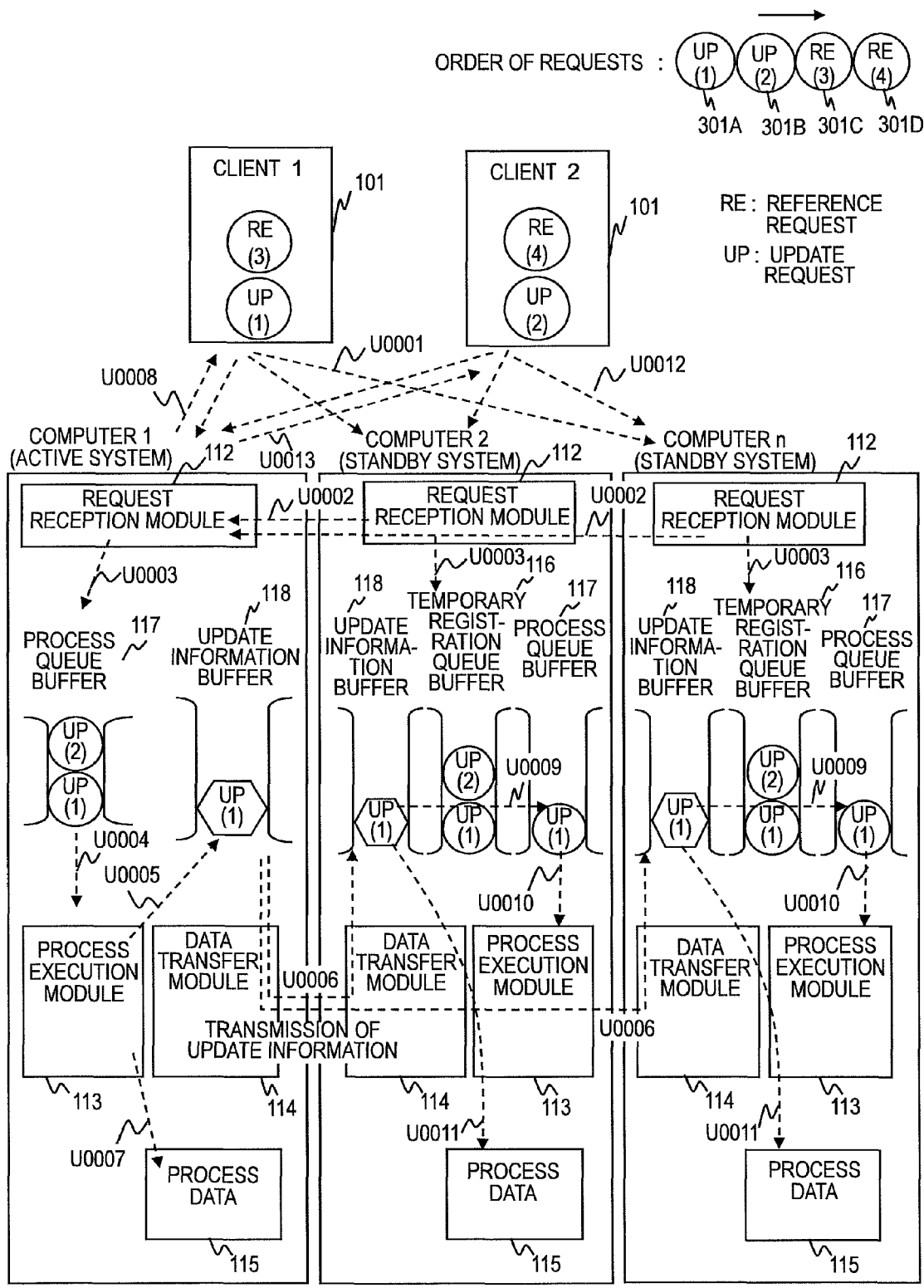
FIG. 15A is a diagram illustrating the case where, after the client transmits the input telegraphic message for an update request, the client transmits the input telegraphic message for the update request.
Figure 15B:
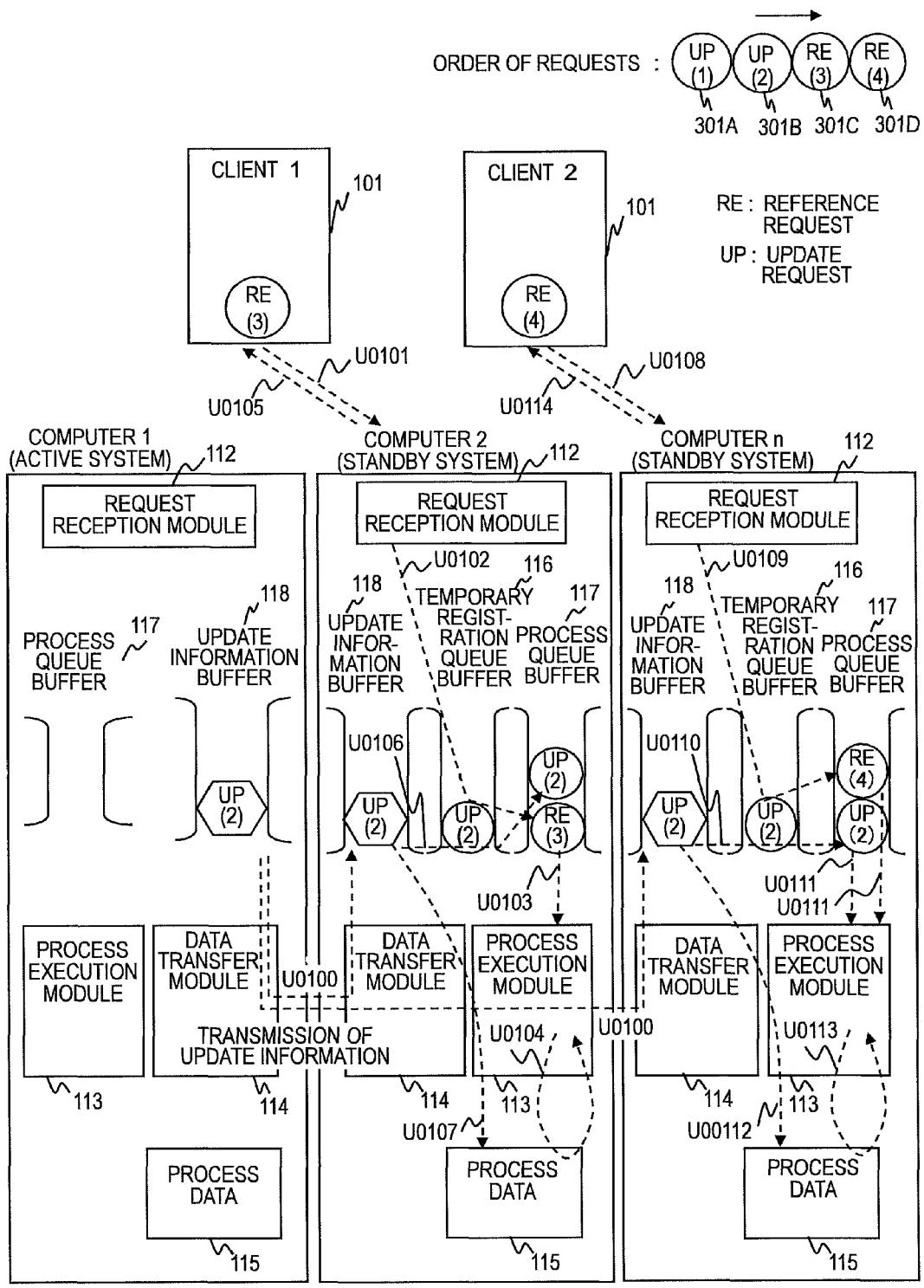
FIG. 15B is a diagram illustrating the case where, after the clients respectively transmit the update requests to the cluster system, and the client receives the result of the process from the active system, the clients transmit respective input telegraphic messages for reference requests to the cluster system.

FIGS. 15A and 15B are diagrams each illustrating an example of the procedure in which the cluster system processes requests transmitted from a client 1 and a client 2 according to the first embodiment of this invention. FIGS. 15A and 15B are diagrams for illustrating the overall processes of the first embodiment of this invention, in which some of the processes are omitted. As for the detailed procedure of each of the processes, it is as described above. In the examples illustrated in FIGS. 15A and 15B, the processes requested of the cluster system by the client 101 individually correspond to the input telegraphic messages 301A, 301B, 301C, and 301D illustrated in FIG. 3.

FIG. 15A is a diagram illustrating the case where, after the client 1 transmits an input telegraphic message for an update request 1, the client 2 transmits an input telegraphic message for an update request 2.

First, the client 1 transmits the update request 1 to the active system and each of the standby systems by multicast transmission (U0001). Each of the active system and the standby systems causes the request reception module 112 to determine the reception of the input telegraphic message 301 (U0002).

The active system stores the input telegraphic message 301 as the received input telegraphic message 411 in the process queue buffer 117 (U0003). Each of the standby systems stores the input telegraphic message 301 as the received input telegraphic message 411 in the temporary registration queue buffer 116 (U0003).

Next, in the active system, the process execution module 113 acquires the received input telegraphic message 411 in the process queue buffer 117 (U0004). Then, the process execution module 113 executes an update process based on the received input telegraphic message 411 acquired thereby, further generates the update information 401, and stores the update information 401 in the update information buffer 118 (U0005). Thereafter, the active system causes the data transfer module 114 to transmit the update information 401 to all the standby systems (U0006).

The active system copies the update information in the process data 115, and determines the update process (U0007). Finally, the active system transmits the result to the client 1 (U0008).

Each of the standby systems causes the data transfer module 114 to receive the update information 401 transmitted from the active system, and store the received update information 401 in the update information buffer 118 (U0006). Thereafter, the standby system stores the received input telegraphic message 411 stored in the temporary registration queue buffer 116 and having the same process queue serial number 402 as that of the update information 401 in the process queue buffer 117 of the own system (U0009).

Next, the standby system causes the process execution module 113 to process the received input telegraphic message 411 in the process queue buffer 117 (U0010). Then, based on the update information 401 having the same process queue serial number 402 as that of the received input telegraphic message 411 and stored in the update information buffer 118, the standby system copies the update in the process data 115 of the own system (U0011).

Next, the client 2 similarly transmits the update request 2 to the active system and each of the standby systems by multicast transmission (U0012). Thereafter, the update request 2 is processed in the same procedure as that used to process the update request 1 from the client 1, in which processes (corresponding to U0005 to U0007) such as the storage of the input telegraphic message in each of the active system and the standby systems, and the execution of the update request 2 by the active system are executed, and the result of the update request 2 is transmitted from the active system to the client 2 (U0013).

FIG. 15B is a diagram illustrating the case where, after the clients 1 and 2 respectively transmit the update requests 1 and 2 to the cluster system, and the client 1 receives the result of the process from the active system, the clients 1 and 2 transmit respective input telegraphic messages for reference requests 3 and 4 to the cluster system. At the time illustrated in FIG. 15B, the standby system has received the update information resulting from the update process executed in the standby system in response to the update request 2 from the client 2 (U0100 corresponding to U0006 in FIG. 15A). However, the process of copying the update in the process data (corresponding to U0009 to U0011) in FIG. 15A) has not been executed yet so that the update information has not been copied in the status illustrated in FIG. 15B.

After the client 2 receives the result of the update request 2 (U0013 in FIG. 15A), the client 1 first transmits the reference request 3 to any one of the computers (which is a computer 2 here) in the standby systems (U0101). The computer 2 in the standby system that has received the reference request 3 compares the input telegraphic message 301 for the reference request 3 received via the request reception module 112 with the received input telegraphic message 411 that has been received prior to the reception of the reference request 3 and is stored in the temporary registration queue buffer 116, and determines whether or not the uncopied received input telegraphic message 411 for the update request from the same client is contained in the temporary registration queue buffer 116.

The update request 2 contained in the temporary registration queue buffer 116 is the update request from the client 2, and hence the input telegraphic message 301 for the reference request 3 from the client 1 is stored as the received input telegraphic message 411 in the process queue buffer 117 without waiting the completion of the processing of the update request 2 (U0102). Thereafter, the process execution module 113 acquires the received input telegraphic message 411 in the process queue buffer 117 (U0103). Then, the process execution module 113 executes the processing of the reference request 3 (U0104), and transmits the result of the execution to the client 1 (U0105).

Thereafter, the computer 2 in the standby system stores the received input telegraphic message 411 including the process queue serial number 402 which matches that of the update information 401 corresponding to the update request 2 received from the active system, and stored in the temporary registration queue buffer 116, in the process queue buffer 117 in the own system (U0106). Subsequently, in the same manner as in the case of the update request 1 illustrated in FIG. 15A, the received input telegraphic message 411 for the update request 2 is acquired from the process queue buffer 117, and the update information 401 is copied in the process data 115 (U0107).

Next, after receiving the result of processing the update request 2 (U0013 in FIG. 15A), the client 2 transmits a reference request 4 to any one of the computers (which is the computer n here) in the standby systems (U0108). The computer n in the standby system that has received the reference request 4 compares the input telegraphic message 301 for the reference request 4 received via the request reception module 112 with the received input telegraphic message 411 that has been received prior to the reception of the reference request 4 and is stored in the temporary registration queue buffer 116, and determines whether or not the uncopied input telegraphic message 301 for the update request from the same client is contained in the temporary registration queue buffer 116.

The update request 2 is the input telegraphic message 301 transmitted from the same client 2 that has transmitted the reference request 4. Accordingly, the computer n waits till the received input telegraphic message 411 for the update request 2 is stored in the process queue buffer 117 in the own system (U0110), and then the input telegraphic message 301 for the reference request 4 is stored as the received input telegraphic message 411 in the process queue buffer 117 (U0109). Thus, in the case where the input telegraphic message 301 for the update request from the same client is present, the computer n waits till the input telegraphic message for the update request is stored in the process queue buffer 117.

Thereafter, the computer n in the standby system causes the process execution module 131 to process the received input telegraphic message 411 for the update request 2 (U0111). Then, based on the update information 401 including the same process queue serial number 402 as that of the received input telegraphic message 411 and stored in the update information buffer 118, the computer n copies the update in the process data in the own system (U0112). Subsequently, based on the received input telegraphic message 411 for the reference request 4 stored in the process queue buffer 117, the computer n processes the reference request 4 (U0113), and transmits the result to the client 2 (U0114).

Thus, as illustrated in FIGS. 15A and 15B, when the client transmits the update request, and the execution result is given as a response, it is ensured that data in the status after the copy of the update request is provided.

The first embodiment of this invention has described the case where one of the standby systems and the active system executes the reference process, but the first embodiment of this invention is also applicable to the case where the plurality of computers are caused to execute the reference process. In the case where the plurality of computers execute the reference process, the execution results are given as responses from the plurality of computers, and it is possible to give, for example, the earliest response as the execution result to the client. In this case, even when the process of copying the result of the process in the active system is delayed in the standby system, and the reference process is delayed, the reference result can be acquired without delay.

Alternatively, in the case of causing the plurality of computers to execute the reference process, it is also possible to wait till all the execution results are received from the plurality of computers, compare all the execution results, determine the execution result by a majority vote, and give the execution result as a response to the client. In this case, even when an abnormality such as a memory failure occurs in a small number of the computers in the cluster system, and erroneous data is given as a response, it is possible to acquire the correct reference result given as a response by a large number of the other computers.

According to the first embodiment of this invention, by assigning the reference request to at least one of the active system and the standby systems, it is possible to improve processing efficiency for the update process in the active system, and efficiently use resources in the standby systems.

Further, according to the first embodiment of this invention, even when any of the standby systems processes the reference request, data consistency can be ensured.

(Second Embodiment)

In the first embodiment of this invention, the client has the request assignment module 103. By contrast, in the second embodiment of this invention, each of the active system and the standby systems has a request assignment module 110. As a result, the request from the client is assigned by the active system and standby systems.

In the second embodiment, the description of a content common to that of the first embodiment will be omitted appropriately.

Figure 16:
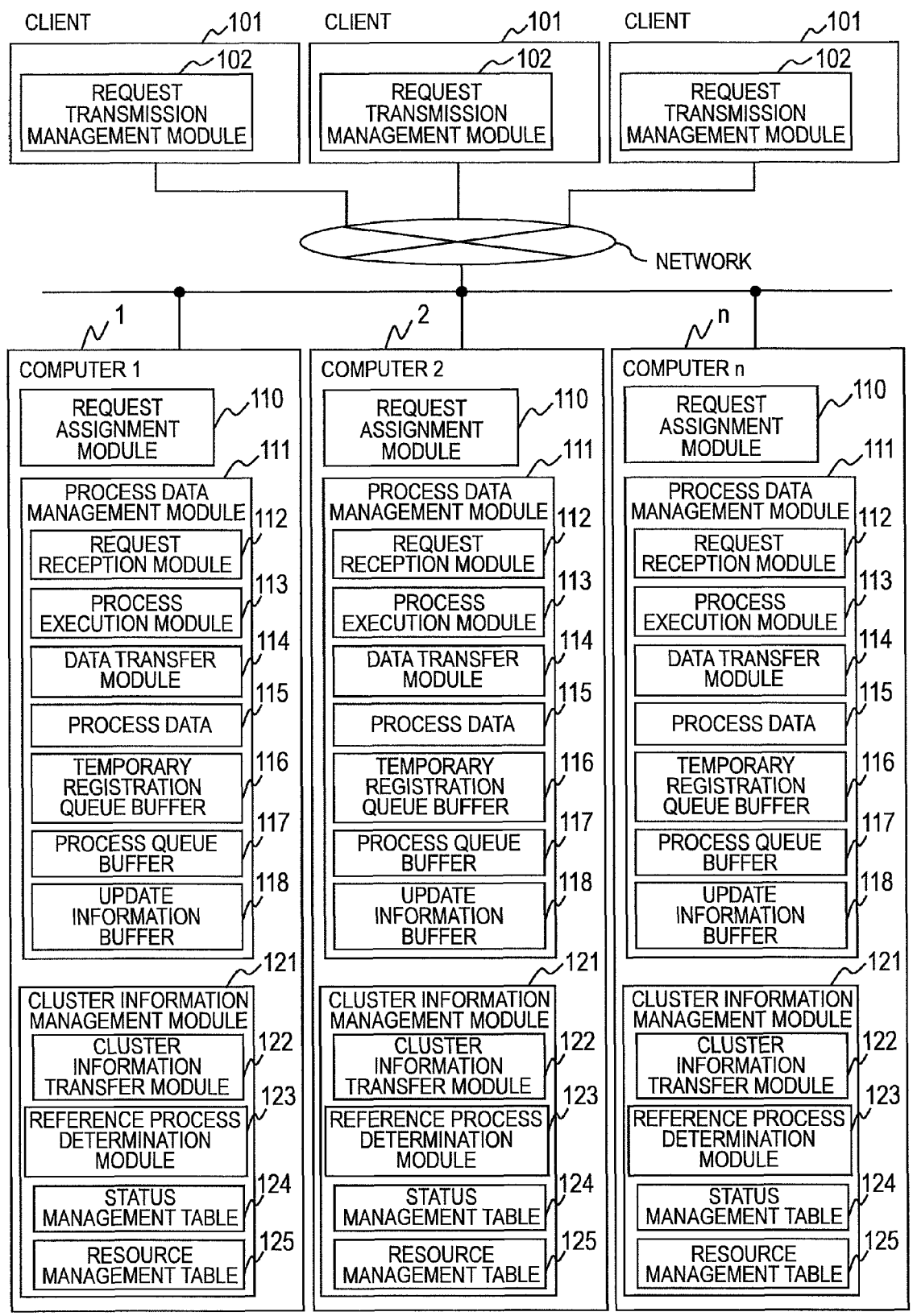
FIG. 16 is a block diagram illustrating an example of a cluster system according to a second embodiment of this invention.

FIG. 16 is a block diagram illustrating an example of the cluster system according to the second embodiment of this invention.

The cluster system according to the second embodiment of this invention includes the computer 1 in the active system, and the plurality of computer 2 to n in the standby systems in the same manner as in the first embodiment. The plurality of clients transmit processing requests to the cluster system. The computers (1 to n) in the active system and the standby systems and the clients are coupled via the network.

The client 101 transmits a processing request to the cluster system. The client 101 has the request transmission management module 102.

The request transmission management module 102 transmits the input telegraphic message 301 requesting a process of any one of the computers in the cluster system. The request transmission management module 102 further receives a response indicating that the cluster system has received the input telegraphic message 301. The request transmission management module 102 also includes the function of receiving the result of processing the input telegraphic message 301.

In transmitting a processing request to the cluster system, the client 101 first causes the request transmission management module 102 to transmit the input telegraphic message 301 to any one of the computers in the cluster system. At this time, the transmission destination may be distributed appropriately among the individual computers constituting the cluster system, and may also be determined according to, for example, a round robin scheme. Then, the client 101 receives a delivery confirmation for the input telegraphic message 301 from the active system or the standby system as the transmission destination. Thereafter, when the requested process is ended in the computer of the transmission destination, the client 101 receives the result of the process from the computer at the transmission destination.

Each of the computers in the active system and the standby systems has the request assignment module 110, the process data management module 111, and the cluster information management module 121. The individual computers in the active system and the standby systems included in the cluster system have the same structure.

The request assignment module 110 has the function of assigning the destination of the request of the input telegraphic message 301 transmitted from the client 101. When the input telegraphic message 301 is an update request, the request assignment module 110 transmits the input telegraphic message 301 by multicast communication to the plurality of computers, i.e., to the active system and the standby systems. On the other hand, when the input telegraphic message 301 is a reference request, the request assignment module 110 transmits the input telegraphic message 301 to at least one of the active system and the standby systems. The request assignment module 110 also includes the function of acquiring, from the status management table 124 in the own system, information on whether each of the computers belongs to the active system or any of the standby systems.

It is also possible to cause the active system to receive the input telegraphic message 301 transmitted from the client 101, and transfer the input telegraphic message 301 to each of the standby systems.

The process data management module 111 and the cluster information management module 121 are the same as in the first embodiment of this invention.

Figure 17:
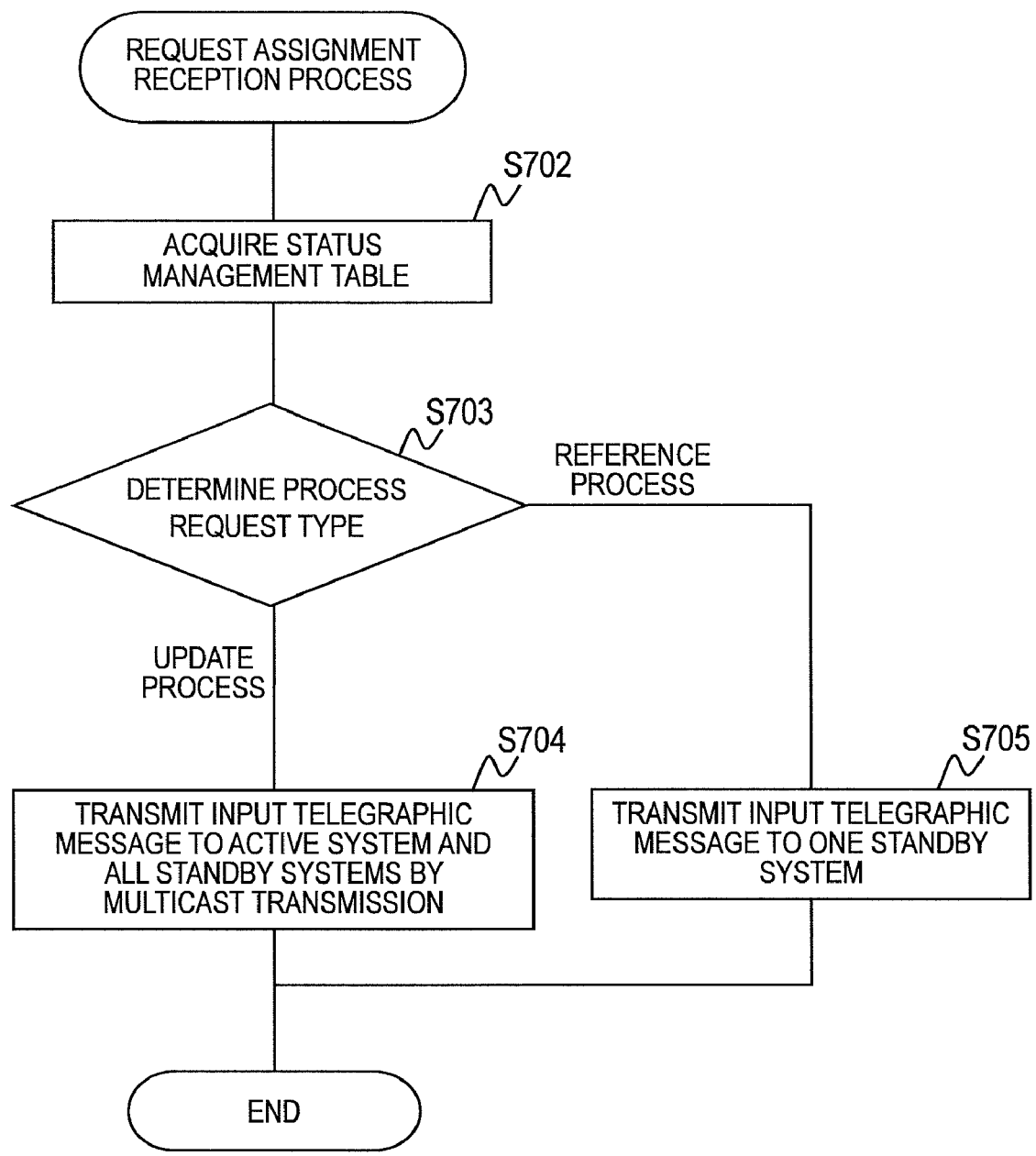
FIG. 17 is a flow chart illustrating the procedure of the process executed by the request assignment module in the active system or the standby system according to the second embodiment of this invention.

FIG. 17 is a flow chart illustrating the procedure of the process executed by the request assignment module 110 in the active system or the standby system according to the second embodiment of this invention.

On receiving the input telegraphic message 301 transmitted from the request transmission management module 102 of the client 101, the CPU 21 in the active system or the standby system acquires the status management table 124 in the own system (S702). Then, the CPU 21 acquires the IP addresses 603 of the active system and the standby systems from the status management table 124. Instead of acquiring the status management table 124 on each reception of the input telegraphic message 301, the status management table 124 may also be acquired in advance. In this case, it is necessary to check at given intervals whether or not the status management table 124 has been updated.

The CPU 21 in the active system or the standby system then determines whether the processing request type is an update request or a reference request (S703). Specifically, the CPU 21 determines based on the request type 304 of the input telegraphic message 301.

When the processing request type is an update request (if Step S703 in "Update Request"), the CPU 21 in the active system or the standby system transmits the input telegraphic message 301 to each of the active system and the standby systems by multicast transmission (S704).

On the other hand, when the processing request type is a reference request (if Step S703 in "Reference Request"), the CPU 21 in the active system or the standby system selects any one of the standby systems from the status management table 124, and transmits the input telegraphic message 301 thereto (S705). The CPU 21 selects the computer to which the input telegraphic message 301 is to be transmitted from among all of the active system and the standby systems in which the reference process enabled/disabled 605 in the record of the status management table 124 is "Enabled". Thereafter, the CPU 21 ends this process.

The second embodiment of this invention has described the case where the computer that has received the processing request from the client assigns the processing request to any one of the standby systems and the active system. However, as described in the first embodiment, the processing request may also be assigned so as to be executed by the plurality of computers. At this time, the execution results are given as responses from the plurality of computers, and it is appropriate to give, for example, the earliest response as the execution result to the client. In this case, as described in the first embodiment, even when the process of copying the result of the process in the active system is delayed in the standby system, and the reference process is delayed, the reference result can be acquired without delay.

It is also possible to cause the plurality of computers that have received the request to give the results of the process to the client 101 as responses, and invalidate the responses other than the earliest response. In this case, in contrast to the case where the plurality of results of the process are given as responses via the request assignment module 110, even when a failure has occurred in the request assignment module 110, the client 101 can acquire the reference result.

Alternatively, in the case where the plurality of computers execute the reference process, it is possible to wait till all the execution results are received from the plurality of computers, compare all the execution results, determine the execution result by a major vote, and give the execution result as a response to the client, as described above. In this case, even when an abnormality such as a memory failure occurs in a small number of the computers in the cluster system, and erroneous data is given as a response, it is possible to acquire the correct reference result given as a response by a large number of the other computers.

According to the second embodiment of this invention, by assigning the reference request to at least one of the active system and the standby systems without giving consideration to the structure of the cluster system on the client side, it is possible to improve processing efficiency for the update process in the active system, and efficiently use resources in the standby systems.

Further, according to the second embodiment of this invention, even when any of the standby systems processes the reference request, data consistency can be ensured in the same manner as in the first embodiment.

While the present invention has been described in detail and pictorially in the accompanying drawings, the present invention is not limited to such detail but covers various obvious modifications and equivalent arrangements, which fall within the purview of the appended claims.

What is claimed is:

1. A data processing method in a cluster system comprising:
    a first computer for receiving a processing request for a task processing, executing the task processing, and holding data used therein;
    a second computer for holding a duplicate of the data held in the first computer, halting the first computer if the first computer is determined to be halted, and receiving and processing the processing request,
    the data processing method including the steps of:
    receiving, by the first computer, at least an update request as the processing request including request identification information to which unique numbers assigned to the individual processing requests in an ascending order are allocated;
    updating, by the first computer, the held data;
    transmitting, by the first computer, the update request including the request identification information to the second computer;

receiving, by the second computer, a reference request including the unique number and transmitted thereto and the update request transmitted from the first computer;

storing, by the second computer, the reference request and the update request as the processing requests; and processing, by the second computer, the processing requests in an ascending order of the unique numbers included in the individual processing requests which have been received and stored;

a client for issuing a request for the task processing; and a request assignment module for assigning the request from the client to at least one of the first computer and the second computer; and the data processing method further includes the steps of:

determining, by the request assignment module, whether the request from the client is an update request or a reference request transmitting, by the request assignment module, the request from the client to the first computer in a case where the request from the client is the update request and transmitting, by the request assignment module, the request from the client to the second computer in a case where the request from the client is the reference request.

2. The data processing method according to claim 1, wherein the unique numbers are time information.

3. The data processing method according to claim 1, wherein:

the cluster system further comprises a third computer for holding the duplicate of the data held in the first computer;

the first computer transmits the request to the second computer and the third computer by multicast communication; and the data processing method further includes the steps of:

receiving, by the first computer, at least the update request as the processing request including the request identification information to which unique numbers assigned to the individual processing requests in an ascending order are allocated;

updating, by the first computer, the held data;

transmitting, by the first computer, the update request including the request identification information to the third computer and the second computer;

receiving, by the third computer, the reference request including the unique number and transmitted thereto and the update request transmitted from the first computer;

storing, by the third computer, the reference request and the update request as the processing requests; and processing, by the third computer, the processing requests in the ascending order of the unique numbers included in the individual processing requests which have been received and stored.

4. The data processing method according to claim 1, further including the steps of:

storing, by the cluster system, system information including load information in the first computer and the second computer;

determining, by the cluster system, based on the system information, whether or not a load on the first computer is smaller than a predetermined load amount; and processing, by the first computer, the reference request in a case where the load on the first computer is smaller than the predetermined load amount.

5. The data processing method according to claim 1, wherein:

the request assignment module is provided in the client; and the data processing method further includes the step of assigning, by the client, the request from the client.

6. The data processing method according to claim 1, wherein:

the request assignment module is provided in the first computer; and the data processing method further includes the step of assigning, by the first computer, the request from the client according to a type of the request.

7. A cluster system comprising:

a first computer for receiving a processing request for a task processing, executing the task processing, and holding data used therein;

a second computer for holding a duplicate of the data held in the first computer, halting the first computer if the first computer is determined to be halted, and receiving and processing the processing request, wherein:

the first computer is configured to:

receive at least an update request as the processing request including request identification information to which unique numbers assigned to the individual processing requests in an ascending order are allocated, update the held data, and transmit the update request including the request identification information to the second computer; and the second computer is configured to:

receive a reference request including the unique number and transmitted thereto and the update request transmitted from the first computer, store the reference request and the update request as the processing requests, and process the processing requests in an ascending order of the unique numbers included in the individual processing requests which have been received and stored;

a client for issuing a request for the task processing; and a request assignment module for assigning the request from the client to at least one of the first computer and the second computer;

determining whether the request from the client is an update request or a reference request;

transmitting, the request from the client to the first computer in a case where the request from the client is the update request; and transmitting the request from the client to the second computer in a case where the request from the client is the reference request.

8. A non-transitory storage medium recorded with a data processing program used in a cluster system comprising:

a first computer for receiving a processing request for a task processing, executing the task processing, and holding data used therein; and a second computer for holding a duplicate of the data held in the first computer, halting the first computer if the first computer is determined to be halted, and receiving and processing the processing request, wherein:

the first computer is configured for:

receiving at least an update request as the processing request including request identification information to which unique numbers assigned to the individual processing requests in an ascending order are allocated;

updating the held data based on the update request; and
transmitting the update request including the request identification information to the second computer; and
the second computer is configured for:
receiving a reference request including the unique number and transmitted thereto and the update request transmitted from the first computer,
storing the reference request and the update request as the processing requests, and
processing the processing requests in an ascending order of the unique numbers included in the individual processing requests which have been received and stored;
a client for issuing a request for the task processing; and
a request assignment module for assigning the request from the client to at least one of the first computer and the second computer;
determining whether the request from the client is an update request or a reference request;
transmitting, the request from the client to the first computer in a case where the request from the client is the update request; and
transmitting the request from the client to the second computer in a case where the request from the client is the reference request.

* * * * *